United States Patent
Wakitani

[11] Patent Number: 6,031,568
[45] Date of Patent: Feb. 29, 2000

[54] MOVING-TARGET TRACKING APPARATUS

[75] Inventor: Jun Wakitani, Kawasaki, Japan

[73] Assignee: Fujitsu Limited, Kawasaki, Japan

[21] Appl. No.: 09/017,313

[22] Filed: Feb. 2, 1998

[30] Foreign Application Priority Data

Sep. 11, 1997 [JP] Japan ................................. 9-247325

[51] Int. Cl.[7] .................................................. H04N 5/225
[52] U.S. Cl. ........................................... 348/169; 382/103
[58] Field of Search .................................... 348/169, 170, 348/171, 172, 214, 219–220, 143, 148, 149, 154–155, 157–158, 699–700; 382/103

[56] References Cited

U.S. PATENT DOCUMENTS

| | | | |
|---|---|---|---|
| 5,416,513 | 5/1995 | Morisaki ................................. | 348/169 |
| 5,473,369 | 12/1995 | Abe ........................................ | 348/169 |
| 5,757,422 | 5/1998 | Matsumura ............................. | 348/169 |
| 5,761,326 | 6/1998 | Brady et al. ............................ | 382/103 |
| 5,764,283 | 6/1998 | Pingali et al. .......................... | 348/169 |
| 5,808,695 | 9/1998 | Rosser et al. .......................... | 348/169 |
| 5,864,630 | 1/1999 | Cosatto et al. ......................... | 382/103 |
| 5,880,782 | 3/1999 | Koyanagi et al. ...................... | 348/169 |
| 5,883,969 | 3/1999 | Le Gouzouguec et al. ............ | 382/103 |

FOREIGN PATENT DOCUMENTS

| | | | |
|---|---|---|---|
| 60-195682 | 10/1985 | Japan ............................... | G06K 9/00 |
| 60-209104 | 10/1985 | Japan ............................... | G01B 11/00 |
| 8-130675 | 5/1996 | Japan ............................... | H04N 5/232 |

*Primary Examiner*—Vu Le
*Attorney, Agent, or Firm*—Staas & Halsey LLP

[57] ABSTRACT

In a moving-target tracking apparatus for tracking a target moving in a dynamic picture image, color information, differential information and target position information based on a prediction for a motion according to the past motion are detected in the form of two-dimensional map. These maps are merged into a single map. A target position is detected in accordance with the merged map. Thus, an operational ability on a real-time basis and a tracking performance are improved.

17 Claims, 11 Drawing Sheets y-DIRECTION DIFFERENTIAL FILTER x-DIRECTION DIFFERENTIAL FILTER

TEMPLATE 1

TEMPLATE 2

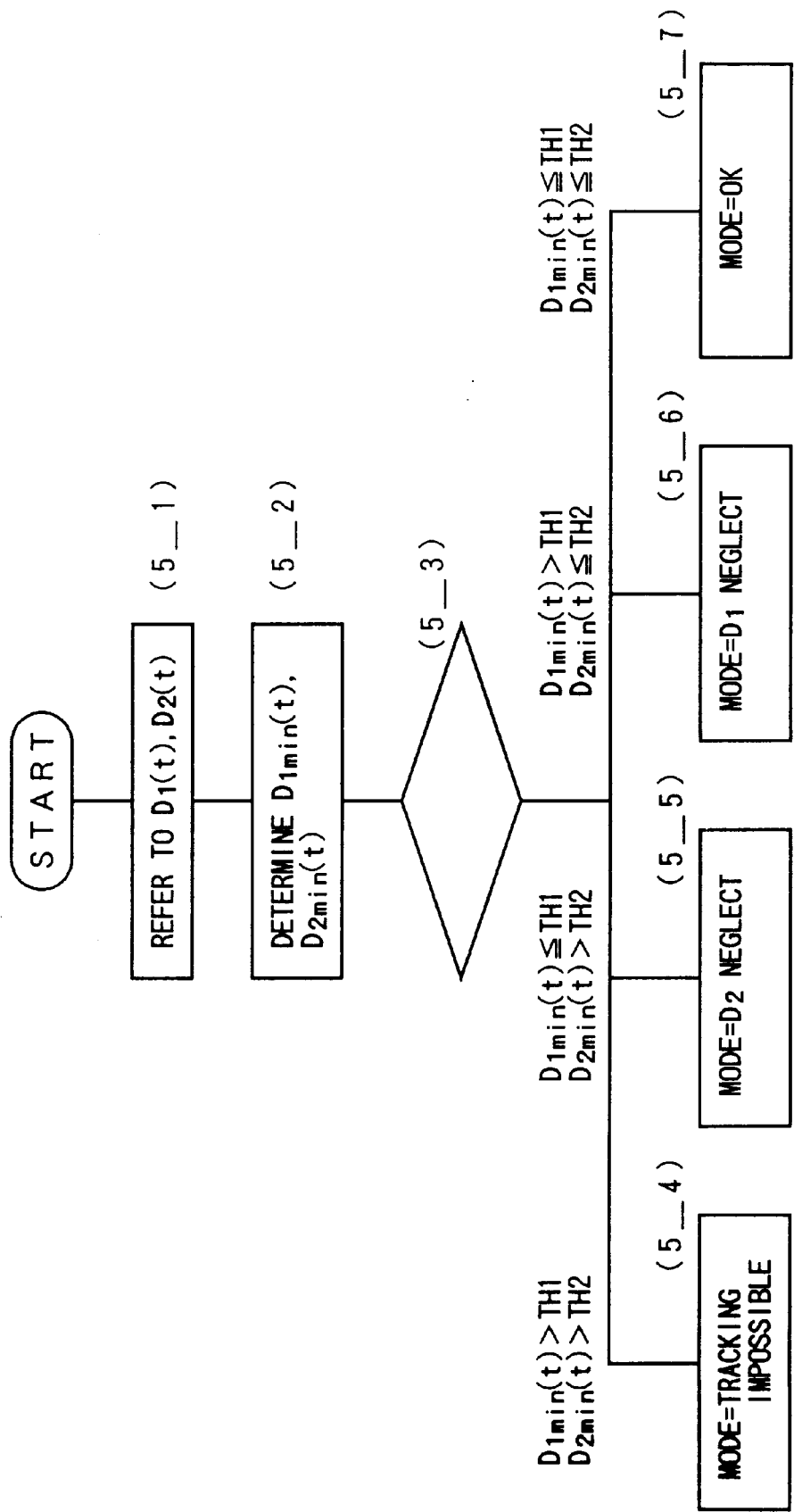

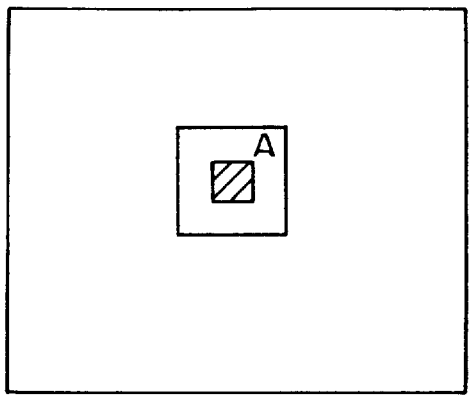
Fig.9A
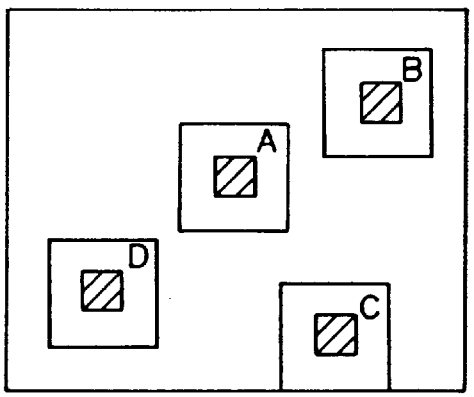
Fig.9B
Fig.9C 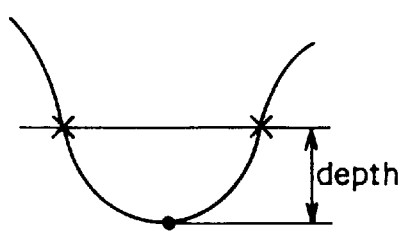 Fig.9D

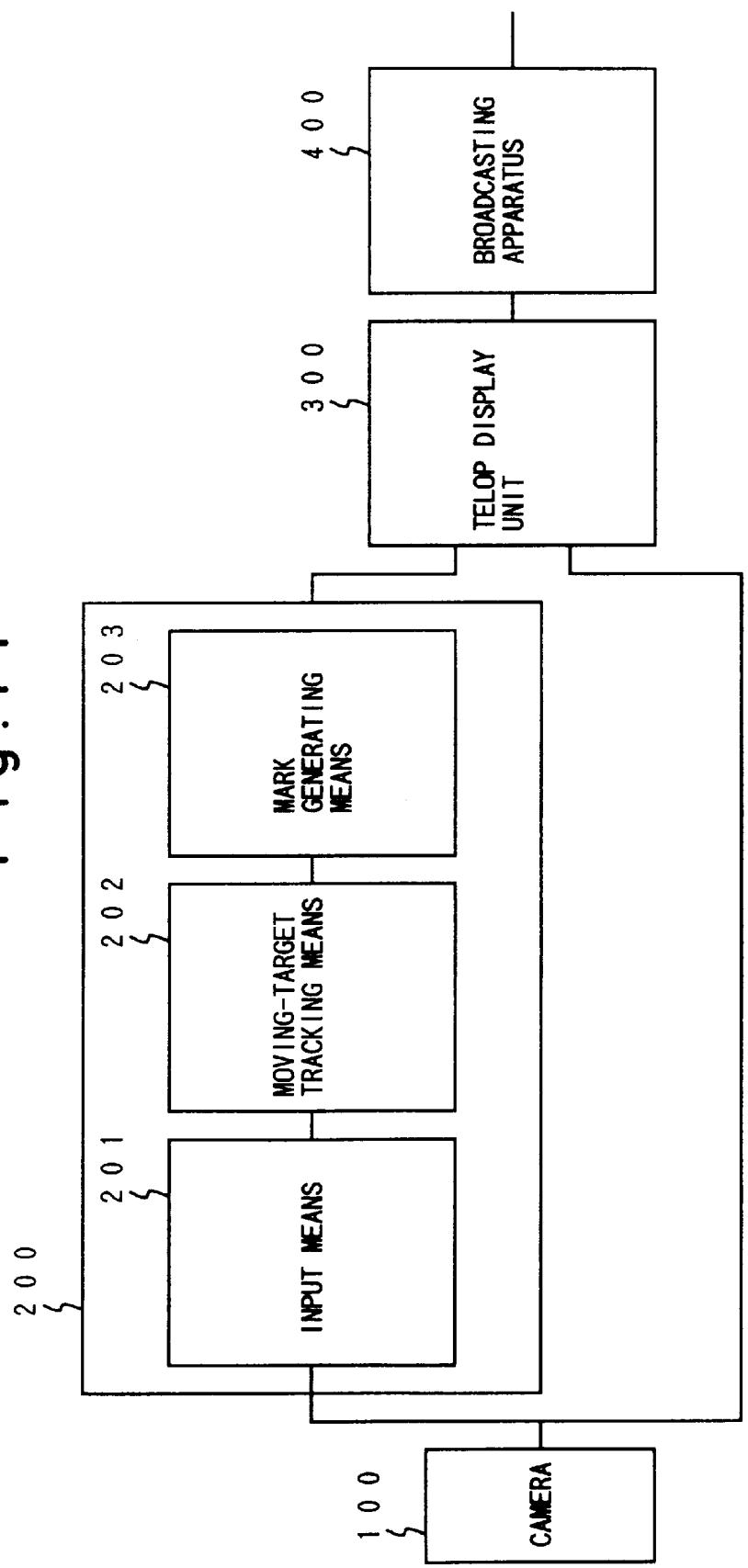

MOVING-TARGET TRACKING APPARATUS

BACKGROUND OF THE INVENTION

1. Field of the Invention

The present invention relates to a moving-target tracking apparatus wherein an original picture image, which consists of a plurality of frames sequentially continued, photographed with a scene including at least one moving target, is inputted and a moving-target projected on the original picture image is tracked.

2. Description of the Related Art

For example, it is desired nowadays that there appears, for example, an apparatus capable of implementing such a matter that on a dynamic picture image obtained through photographing the state of a soccer game in a wide field, a specified soccer player, who is designated from among a plurality of soccer players playing the soccer game, is tracked.

Hitherto, there already exists several types of apparatus in which a result of tracking of the moving target, for example, the above-mentioned soccer player, is displayed on a dynamic picture image. Those apparatuses are, however, for processing a photographed-state dynamic picture image through a software on an off-line basis, and take a lot of time for processing. Thus, those apparatuses are of no use at all in the event that such an operational ability on a real-time basis that a dynamic picture image is photographed and immediately after a specified player is tracked is needed. Further, in such a scene that a specified player is tracked in the soccer game as mentioned above, the specified player will be changed on the photographed picture image in such a manner that the player runs, stops, changes in direction, falls down, etc. Thus, according to the earlier developed apparatuses, the complete tracking of the player as a target is impossible even with the off-line processing, and as a result there is a need to conduct a manual tracking by an operator with respect to an aided tracking impossible section. This will be associated with a problem that a complete automation is not implemented.

Recently, as a moving-target tracking scheme regarding an operational ability on a real-time basis as important, there has been developed a scheme according to a template matching based on the correlation operation. According to this scheme, restricting a search area to a local area makes it possible to an amount of calculations, and it is possible to perform the processing on a parallel basis in view of the principle of the calculation.

According to this scheme, however, a template is made up beforehand, and a correlation operation with the template made up beforehand is simply performed. Thus, this scheme has such a weak point that it is easy to lose sight of a target, such as the player of the above-mentioned soccer game, which will be deformed with great amount on the picture image, and while the operational ability on a real-time basis is improved, it is not satisfactory in the tracking performance.

With respect to an adoption of types of information for tracking, there has been made various proposals, for example, a proposal (Japanese Patent Application Laid Open Gazette Hei. 8-130675) which says that it is recommended that color information is used to determine a movement vector, a proposal (Japanese Patent Application Laid Open Gazette Sho. 60-209104) which says that it is recommended that a differential image, which is obtained by spatially differentiating an image provided for a usual observation, is used to perform a correlation operation, and a proposal (Japanese Patent Application Laid Open Gazette Sho. 60-195682) which says that it is recommended that information as to the past motion of the target to be tracked is used to predict the subsequent motion of the target. However, none of those proposals satisfies requirements of both an operational ability on a real-time basis and a tracking performance sufficient for practical use.

SUMMARY OF THE INVENTION

In view of the foregoing, it is therefore an object of the present invention to provide a moving-target tracking apparatus contributing to the improvement of an operational ability on a real-time basis and a tracking performance.

To achieve the above-mentioned objects, according to the present invention, there is provided a moving-target tracking apparatus wherein an original picture image, which consists of a plurality of frames sequentially continued, photographed with a scene including at least one moving object, is inputted and a moving-target selected from among moving objects projected on the original picture image is tracked, said moving-target tracking apparatus comprising:

a first correlation value distribution operational unit for determining a distribution of a first correlation value between a color template to be compared with the moving-target projected on a color separation image constituting the original picture image, and the color separation image;

a differential processing unit for spatially differentiating the original picture image to determine a differential image;

a second correlation value distribution operational unit for determining a distribution of a second correlation value between a differential template to be compared with the moving-target projected on the differential image, and the differential image;

a motion prediction value distribution operational unit for determining a distribution of a motion prediction value representative of a probability of existence of the moving-target in accordance with a past motion of the moving-target;

an evaluation value distribution operational unit for determining an evaluation value through merging the first correlation value, the second correlation value and the motion prediction value to determine a distribution of the evaluation value representative of an existing position of the moving-target; and a position detecting unit for detecting the existing position of the moving-target in accordance with the distribution of the evaluation value determined in said evaluation value distribution operational unit.

With respect to the term "color separation image constituting the original picture image" referred to in the present invention, in the event that it is concerned with a black and white image having only brightness, since it is simply associated with a single color of image, the color separation image implies the original picture image itself. On the other hand, in the event that the original picture image consists of, for example, R(Red), G(Green) and B(Blue) of colors of images, the respective colors of images are the color separation image. In the present invention, when a plurality of color images exist, it is either acceptable that only a certain color of color separation image is adopted, or a plurality of colors of color separation images are adopted. When a plurality of colors of color separation images are adopted, a plurality of color templates each corresponding to the associated color separation image are prepared.

It is not necessary that the first correlation value and the second correlation value, which are determined by the first correlation value distribution operational unit and the second correlation value distribution operational unit, respectively, are correlation values determined by the correlation operation in a mathematical meaning, but anyone is acceptable, as the first and second correlation values, which are indexes each of a degree of approximation of a template to a segment area. Here, a value involved in an index of a degree of the approximation is referred to as the "correlation value", and an operation for determining the "correlation value" is referred to as the "correlation operation".

The first correlation value distribution operational unit determines a first correlation value representative of a degree of approximation of, for example, a color template to a segment area having the same size as the color template, the segment area being cut out from a color separation image, and sequentially performs an operation in which the first correlation value thus obtained is associated with a pixel on the segment area, while a cut-out position of the segment area from the color separation image is sequentially altered, so that a distribution of the first correlation value on a predetermined search area consisting of a whole area of the original picture image or the segment area is determined. The second correlation value distribution operational unit determines a second correlation value representative of a degree of approximation of, for example, a differential template to a segment area having the same size as the differential template, the segment area being cut out from a differential image, and sequentially performs an operation in which the second correlation value thus obtained is associated with a pixel on the segment area, while a cut-out position of the segment area from the differential image is sequentially altered, so that a distribution of the second correlation value on the above-mentioned search area is determined.

While it is acceptable that the search area referred to in the present invention is either a whole area of the original picture image or a segment area, it is preferable, taking account of a size of the original picture image, and a size and a moving velocity of the moving-target, that the search area is restricted to a local area as much as possible, from a point of view of reduction of the amount of operations.

As mentioned above, hitherto, regarding tracking the target, there have been proposed a scheme in which color information is adopted, a scheme in which an image is differentiated, and a scheme in which a motion of the target is predicted in accordance with the past movement of the target. It is important, however, to consider how these schemes are combined to ensure an operational ability on a real-time basis and also to improve a tracking performance.

According to the present invention, the correlation operation for the color separation image to the color template is performed to determine a distribution of the first correlation value (it happens that the distribution of the first correlation value is referred to as a "color space distortion map"; the correlation operation for the differential image to the differential template is performed to determine a distribution of the second correlation value (it happens that the distribution of the second correlation value is referred to as a "differential space distortion map". According to the present invention, the two distortion maps are determined in accordance with the above-mentioned correlation operations, and in addition a motion of the target is predicted in accordance with the past motion of the target, so that a distribution of the motion prediction value (it happens that the distribution of the motion prediction value is referred to as a "motion prediction value map" is determined. In this manner, according to the present invention, results of these three schemes are arranged in form to three distributions (maps) on the same search area. This aspect is an important feature of the present invention. This feature makes it possible to facilitate merging of these three distributions, or merging of tracking results according to these three schemes, and thereby ensuring an operational ability of real-time basis and also implementing a high aided tracking of a tracking performance in which the tracking results according to these three schemes are merged.

In the moving-target tracking apparatus according to the present invention, it is preferable that said evaluation value distribution operational unit includes a reliability evaluation unit for evaluating a reliability of the distribution of the first correlation value, and determines the distribution of the evaluation value upon eliminating the distribution of the first correlation value, which is evaluated as low in the reliability, from a processing for determining the distribution of the evaluation value. Alternatively, it is acceptable that said evaluation value distribution operational unit includes a reliability evaluation unit for evaluating a reliability of the distribution of the first correlation value and a reliability of the distribution of the second correlation value, and determines the distribution of the evaluation value upon eliminating the distribution of the first correlation value, which is evaluated as low in the reliability, and the distribution of the second correlation value, which is evaluated as low in the reliability, from a processing for determining the distribution of the evaluation value.

It happens that a distribution (distortion map) of a correlation value, which is concerned with a situation that a position of a target is not grasped well owing to a deformation of the target and the like, is determined. For this reason, a reliability of distortion maps is evaluated by, for example, a scheme of threshold processing or the like, and a distortion map, which is involved in a low reliability, is eliminated from a merging process for determining the "distribution of the evaluation value" for the overall evaluation. This feature makes it possible to determine a high reliability of "distribution of the evaluation value", and thereby contributing to a further improvement of a tracking performance.

As compared with the differential space distortion map, the color space distortion map is involved in an extremely high possibility that a low reliability of distortion map is determined. Consequently, while it is preferable that the reliability evaluation unit evaluates the reliability on both the color space distortion map and the differential space distortion map, it is acceptable, in the event that restrictions in time or in circuit scale are concerned, that the reliability evaluation unit evaluates the reliability only the color space distortion map.

In the moving-target tracking apparatus according to the present invention, it is preferable that said color template includes a temporary template to be sequentially renewed, and said moving-target tracking apparatus further comprises a color template renewal unit for merging an image area on the color separation image, including the existing position of the moving-target detected by said position detecting unit, with the temporary template to renew the temporary template.

As mentioned above, as compared with the differential space distortion map, the color space distortion map is poor in the reliability. This means that it is hard to catch the target on the color separation image. For this reason, a temporary template, as one of the color templates, is prepared to renew the temporary template in compliance with the situation.

This feature makes it possible to provide a color template meeting the situation, and thereby improving the reliability of the color space distortion map.

In the above-mentioned moving-target tracking apparatus, it is preferable that said evaluation value distribution operational unit comprises:

a first merge application unit for determining a merge correlation value for each pixel through merging the first correlation value with the second correlation value for each pixel to determine a distribution of the merge correlation value; and a second merge application unit for determining an evaluation value for each pixel through merging the merge correlation value determined in said first merge application unit with the motion prediction value determined in said motion prediction value distribution operational unit for each pixel to determine the distribution of the evaluation value, and that said color template renewal unit comprises:

an approximation object detecting unit for detecting existing positions of an approximation object approximated to the moving-target in accordance with the merge correlation value; and an evaluation/merger unit for renewing the temporary template in such a manner that a first approximation degree representative of an extent of an approximation between a first image area on the color separation image, including the existing position of the moving-target detected by said position detecting unit, and the temporary template, and a second approximation degree representative of an extent of an approximation between the first image area and a second image area including an existing position of the approximation object detected by said approximation object detecting unit, are detected, and in the event that the first approximation degree is larger than the second approximation degree, the first image area is merged with the temporary template.

It is necessary for a template to detect the target with great accuracy. Thus, it is desired that the template sensitively reacts on the target, and is hard to react on other than the target.

For this reason, adopting the above-mentioned arrangement permits a temporary template to renew, only when an image area approximated to the concerned temporary template is determined, using the image area, and thereby producing a temporary template suitable for the present situation of the target and more surely performing a discrimination between it and other moving objects and the like.

In the moving-target tracking apparatus according to the present invention, it is preferable that the moving-target tracking apparatus further comprises a correlator for determining a correlation value integrating the absolute value of difference of pixel values assigned to mutually associated pixels of two images or image areas, throughout the two images or image areas, said correlator being used on a common basis for said first correlation value distribution operation unit and said second correlation value distribution operation unit, alternatively, being individually provided for each of said first correlation value distribution operation unit and said second correlation value distribution operation unit, wherein said differential processing unit causes said correlator to take a partial charge of a differential operation of differentiating the original picture image to determine the differential image.

As one of the desired aspects of a correlation operational algorithm in the first correlation value distribution operation unit and the second correlation value distribution operation unit of the moving-target tracking apparatus according to the present invention, it is possible to adopt a correlation operational algorithm for determining a correlation value integrating the absolute value of difference of pixel values assigned to mutually associated pixels of two images or image areas, throughout the two images or image areas. Adoption of such a correlation operational algorithm makes it possible to replace the multiplication by the subtraction in the correlation operation in a mathematical meaning, and thereby very promptly determining the correlation value.

The use of such a correlator makes it also possible, as will be described later, to let the correlator perform a part of the differential operation involved in determination of a differential image from an original picture image. While it is acceptable that the differential processing unit has a module of its own for performing the differential operation, it is also acceptable that the differential processing unit uses the above-mentioned correlator on a common basis. The common use of the correlator makes it possible to reduce the circuit scale by the corresponding.

In the moving-target tracking apparatus according to the present invention, it is preferable that said motion prediction value distribution operational unit determines a prediction motion vector predicting a motion of the moving-target from a present instant to a next instant, and provides such a processing that a prediction value, which indicates a maximum probability at an existence prediction position of the moving-target at the next position represented by the prediction motion vector, and a probability which is lowered with further distances from the existence prediction position, is associated with each of pixels on a search area.

While an important feature of the moving-target tracking apparatus according to the present invention resides in the point that when a motion of a target is predicted from the past motion of the target, a distribution of the motion prediction value (the motion prediction value map) is determined, but it is not concerned with a matter that only the motion vector is determined as in the prior art, it is to be noted that there is a highest possibility that the target is translated to a translation prediction position of the target indicated by the prediction motion vector. For this reason, the motion prediction value distribution operational unit determines a prediction motion vector, and provides such a processing that a prediction value, which indicates a maximum probability at an existence prediction position of the moving-target at the next position represented by the prediction motion vector, and a probability which is lowered with further distances from the existence prediction position, is associated with each of pixels on a search area. This feature makes it possible to expect a more reliable tracking.

To determine the prediction motion vector, it is preferable that said motion prediction value distribution operational unit determines a prediction motion vector predicting a motion of the moving-target from a present instant to a next instant in accordance with the prediction motion vector determined at a past instant, which is representative of the existing prediction position of the moving-target at the present instance, and a motion vector representative of an actual motion of the moving-target, which is determined based on a difference between existence positions of the moving-target detected by said position detecting unit at both the past instant and the present instant.

The prediction motion vector determined by the algorithm as mentioned above has a meaning of a history of the tracks left in passing of the target in the past. For this reason, as mentioned above, the subsequent prediction motion vector is determined in accordance with the prediction motion vector determined at a past instant, which is representative of the existing prediction position of the moving-target at the present instance, and a motion vector representative of an actual motion of the moving-target, which is determined based on a difference between existence positions of the moving-target detected by said position detecting unit at both the past instant and the present instant. This feature makes it possible to determine a higher reliability of prediction motion vector, taking account of the past motion of the target, and thereby improving a tracking performance of the target.

To determine the motion prediction value map after the prediction motion vector is determined, it is acceptable that said motion prediction value distribution operational unit provides such a processing that a motion prediction value, which is given as a function of a distance on the existence prediction position of the moving-target represented by said prediction motion vector, is associated with each of pixels on the search area. Alternatively, it is preferable that said motion prediction value distribution operational unit provides such a processing that a motion prediction value, having two types of weight in which weight for a distance in a direction of the prediction motion vector is different from weight for a distance in a direction intersecting the direction of the prediction motion vector, said motion prediction value being given in form of a function of said two distances, is associated with each of pixels on the search area.

Usually, there is expected a high possibility that a target, which is now moving at a certain speed, will translate in the same direction also at the next instant. For example, in such a situation that this situation is applicable, there is plotted an elliptical configuration of motion prediction value map having the major axis in a direction of the prediction motion vector for instance. This feature makes it possible to expect a stable tracking. According to the moving-target tracking apparatus according to the present invention, it is not always needed to provide the major axis in a direction of the prediction motion vector. For example, when the moving-target tracking apparatus according to the present invention is applied to a target having a movement abundant in curves, it is preferable to provide the major axis in a direction intersecting the direction of the prediction motion vector. Alternatively, when the moving-target tracking apparatus according to the present invention is applied to a target having a movement in which direct-motions and curves are expected on even ground, it is acceptable to adopt an isotropic configuration of motion prediction value map having no major axis and short axis in any directions.

Further, to determine the motion prediction value map, it is preferable that said motion prediction value distribution operational unit provides such a processing that a motion prediction value, given in form of a function in which a magnitude of the prediction motion vector is a variable, is associated with each of pixels on the search area.

Assuming that some player in a soccer game for instance is selected as a target, there is expected a high possibility that if the target is now concerned with a quick behavior, then the quick motion is continued also at the subsequent instant, and on the other hand, if the target is now concerned with a slow behavior, then the behavior of the target will be altered to different behaviors. Thus, there is plotted a motion prediction value map following a behavior of the target taking account of a magnitude of the prediction motion vector. This feature makes it possible to implement a more stable tracking of the target.

Incidentally, it is of course acceptable that the motion prediction value map is plotted taking account of both the direction and the magnitude of the prediction motion vector.

In the moving-target tracking apparatus according to the present invention, it is acceptable that said second correlation value distribution operational unit sets up as the differential template a predetermined image area on a differential image, including a predetermined position on the differential image, which is identical with a predetermined position on the original picture image designated prior to tracking the moving-target.

This feature makes it possible to track the target using the differential template thus set up.

Further, in the moving-target tracking apparatus according to the present invention, it is acceptable that said second correlation value distribution operational unit detects a segment area on an image area having a size larger than a size of a differential template, on a differential image, said image area including a predetermined position on the differential image, which is identical with a predetermined position on the original picture image designated prior to tracking the moving-target, said segment area being high in a degree of approximation to a common template set up on a common basis to moving objects capable of being designated as the moving-target, and having a same size as the differential template, and sets up said segment area as the differential template.

In the event that a target is designated on an original picture image, it often happens that the target is moving particularly on a dynamic picture image, and thus there is a scene which is hard to exactly designate the target. In this case, there is prepared a common plate which reacts to any of moving objects, including the target, approximated to the target, and when it is intended that a certain target is designated, and the neighbor of the target is designated, the target is located from the wider area including the designated point, and then the located target is cut out to set up a differential template. This feature makes it possible to set up the proper differential template, even if the designated position is associated with an error.

In this case, it is preferable that said second correlation value distribution operational unit comprises a differential template renewal unit for merging with the differential template image areas on the differential image, which are detected by said position detecting unit at one or more instants after the differential template is set up first, each of the image areas including an existence position of the moving-target, to renew the differential template, said differential template renewal unit being operative at a predetermined initial stage after an initiation of tracking of the moving-target.

In the event that the common template is used to cut out a segment area of the differential image, and the cut out segment area is set up as the differential template, there is a possibility that the cut out segment area involves somewhat errors, since the common template is made up in such a manner that it may react to not only the target, but also the moving objects and the like over the remarkably wide range. Thus, the differential template renewal unit is used to renew the differential template at a predetermined initial stage after an initiation of tracking of the moving-target. This feature makes it possible to set up the more exact differential template, and thereby implementing the more stable tracking of the target.

With respect to the color template, it is preferable that said color template includes a fixed template, and said first correlation value distribution operational unit sets up as the fixed template an image area on the color separation image, which is detected by said position detecting unit at an instant when the differential template is set up or finally renewed, the image area including an existence position of the moving-target.

When a segment area to be cut out as the differential template is determined on the differential image, it is possible to use as a color template a segment area on the color separation image, which is the same as the segment area on the differential image. The case that the color template includes the temporary template has been explained above. On the other hand, in the event that the color template includes the fixed template, a segment area on the color separation image, which is the same as the segment area on the differential image, to be cut out as the differential template, is cut out as the fixed template. This feature makes it possible to set up the exact color template.

To set up the color template, as compared with the detection in which the common template effecting on the color separation image is set up and a segment area to be set up as the color template on the color separation image is detected, the detection on the differential image as mentioned above is generally more effective in obtaining a greater accuracy of detection precision.

Further, there is provided additionally a moving-target tracking apparatus comprising:

input means for sequentially continuously inputting an original picture image, which consists of a plurality of frames, photographed with a scene including at least one moving object;

moving-target tracking means for tracking a moving-target in which a position of the moving object is varied among the plurality of frames, and for sequentially outputting positions of the moving object on the plurality of frames on a basis of time of the original picture image being sequentially continuously inputted; and mark generating means for indicating a mark on a position of the moving-target tracked by said moving-target tracking means.

Generating the mark makes it possible to obtain a dynamic picture image noticing the existence and the behavior of a certain moving object.

BRIEF DESCRIPTION OF THE DRAWINGS

FIG. 5 is an explanatory view useful for understanding an operation of a reliability evaluation unit;

FIGS. 9(A), 9(B), 9(C) and 9(D) are explanatory views useful for understanding the function of an approximate object detecting unit;

FIG. 14 is a schematic diagram showing a moving-target tracking apparatus according to an alternative embodiment of the present invention.

DESCRIPTION OF THE PREFERRED EMBODIMENTS

Hereinafter, there will be described embodiments of the present invention.

Figure 1:
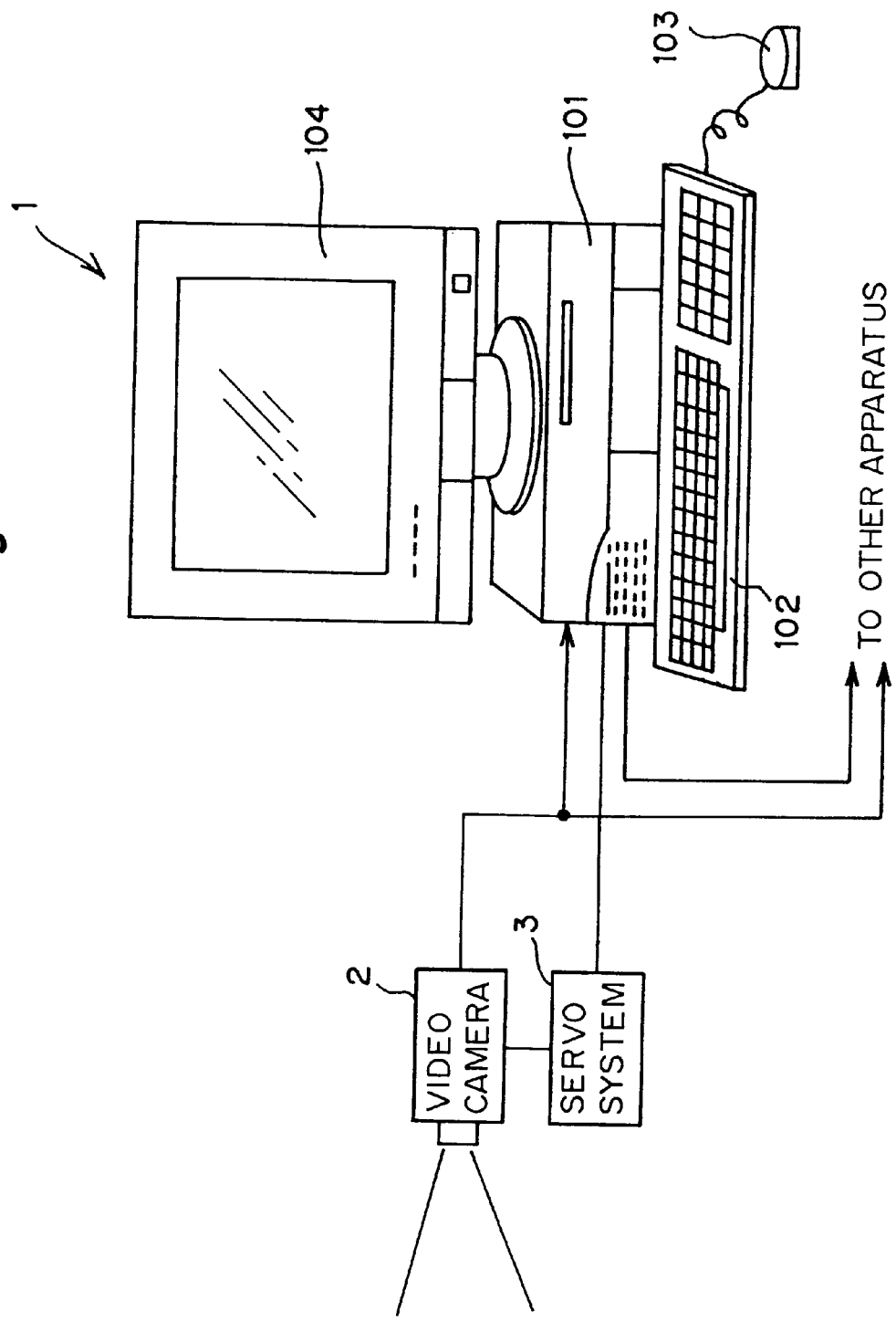
FIG. 1 is a typical illustration of an aided tracking system including a moving-target tracking apparatus according to an embodiment of the present invention.

FIG. 1 is a typical illustration of an aided tracking system including a moving-target tracking apparatus according to an embodiment of the present invention.

In the aided tracking system shown in FIG. 1, the moving-target tracking apparatus according to an embodiment of the present invention is implemented inside a computer system 1.

A video camera 2 is driven by a servo system 3, and is able to turn vertically and horizontally. A picture image, which is obtained through photographing by the video camera 2, is taken into the computer system 1 in which a moving-target projected in the picture image is detected, and the servo system 3 is controlled in such a manner that the moving-target is always included in the picture image obtained through photographing by the video camera 2, so that the video camera 2 turns vertically and horizontally.

The picture image obtained by the video camera 2 is not only taken into the computer system 1, but also transmitted together with position information of the moving-target, which position information is outputted from the computer system 1, to another apparatus, for example, a broadcast equipment (not illustrated). In the broadcast equipment, such an image processing that the moving-target is displayed with a special color so that only the moving-target stands out is practiced, and finally the picture image is televised through going on waves, or recorded for the late broadcasting and the like.

The computer system 1 comprises a main frame 101, a keyboard 102, a mouse 103 and a CRT display unit 104. The main frame 101 incorporates thereinto a CPU for executing a program, a hard disk for saving programs and data, an I/O board for receiving picture images from the video camera 2 and for outputting signals to be transmitted from the computer system 1 to the servo system 3 and other apparatus, a floppy disk driving device for accessing a floppy disk loaded, a board on which a correlator (will be described later) is loaded, as a peculiar one for the computer system 1, etc.

Figure 2:
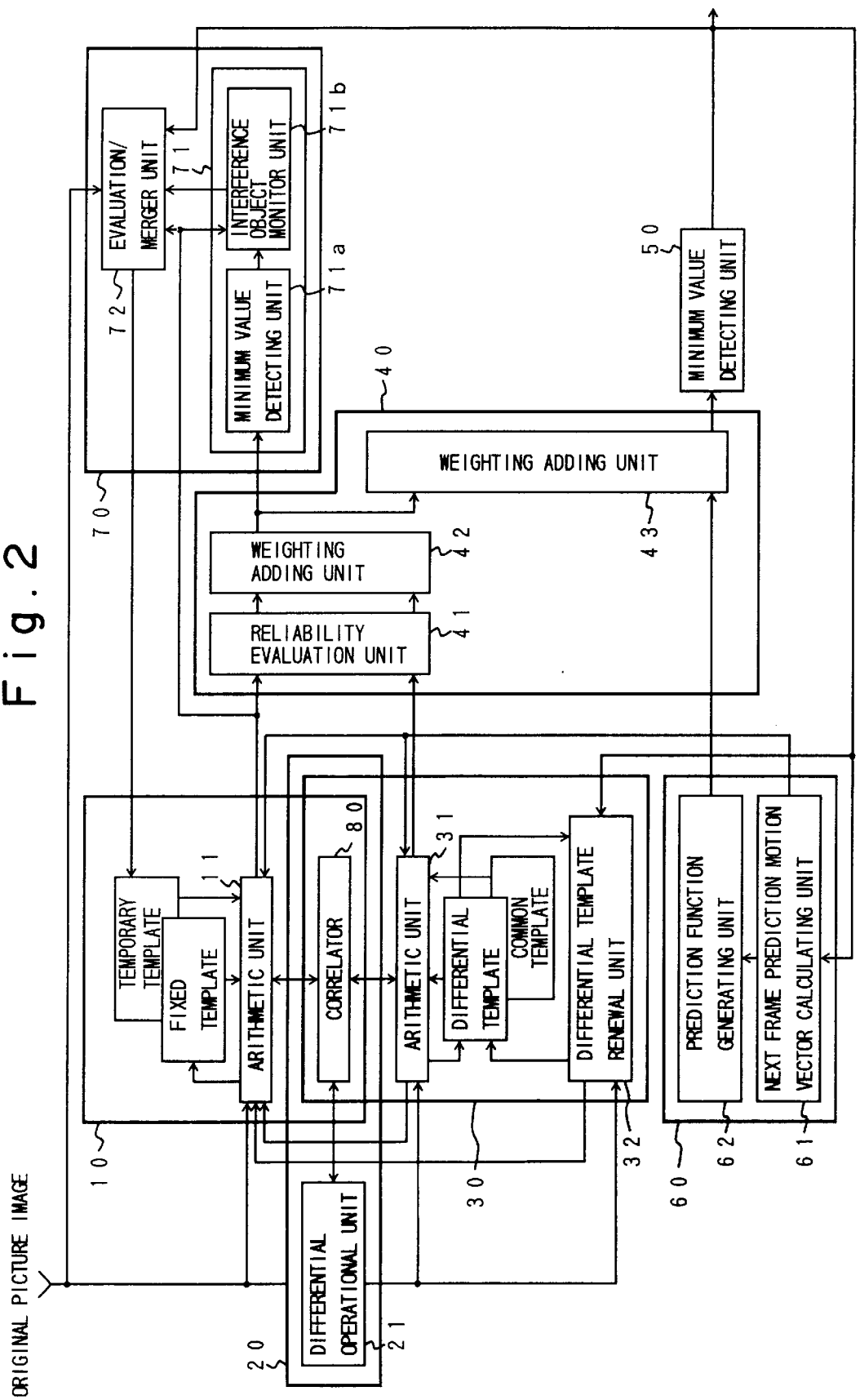
FIG. 2 is a schematic diagram showing the moving-target tracking apparatus according to the embodiment of the present invention, which is constructed in the computer system shown in FIG. 1.

FIG. 2 is a schematic diagram showing the moving-target tracking apparatus according to the embodiment of the present invention, which is constructed in the computer system shown in FIG. 1.

An original picture image entered the moving-target tracking apparatus is a dynamic picture image consisting of a series of number of frames. Each of the frames is subjected to a processing which will be described later, and a position of a certain designated moving-target is detected for each frame so that an aided tracking for the moving-target is performed. It is to be noted that in the following explanation, to avoid troublesomeness of the explanation, unless it is distinctively expressed, a picture image on each frame and a dynamic picture image as a whole are simply addressed as an original picture image without distinction. This is similar as to the matter of decomposition images constituting the original picture image and differential images obtained through differentiating the original picture image.

First, an arrangement of the moving-target tracking apparatus shown in FIG. 2 will be described hereinafter, prior to the explanation of functions of the respective structural elements.

The moving-target tracking apparatus shown in FIG. 2 comprises a color space distortion map plotting unit 10, a differential processing unit 20, a differential space distortion map plotting unit 30, an evaluation value map plotting unit 40, a minimum value position detecting unit 50, a motion prediction value map plotting unit 60, and a color template renewal unit 70.

The color space distortion map plotting unit 10 corresponds to an embodiment of the first correlation value distribution operation unit referred to in the present invention. The differential processing unit 20 corresponds to an embodiment of the differential processing unit referred to in the present invention. The differential space distortion map plotting unit 30 corresponds to an embodiment of the second correlation value distribution operation unit referred to in the present invention. The evaluation value map plotting unit 40 corresponds to an embodiment of the evaluation value distribution operation unit referred to in the present invention. The minimum position detecting unit 50 corresponds to an embodiment of the position detecting unit referred to in the present invention. The motion prediction value map plotting unit 60 corresponds to an embodiment of the motion prediction value distribution operation unit referred to in the present invention. The color template renewal unit 70 corresponds to an embodiment of the color template renewal unit. Hereinafter, the internal structures of the respective units will be explained.

It is to be noted that any of the following various types of templates and maps are provided in the form of a type of image having a two-dimensional extent.

The moving-target tracking apparatus shown in FIG. 2 has a correlator 80 which is used on a common basis among the color space distortion map plotting unit 10, the differential processing unit 20, and the differential space distortion map plotting unit 30.

According to the correlator 80, in the event that data associated with pixels of two images (including a partial area of images and templates) are expressed by $A_{xy}$ and $B_{xy}$, respectively, a value d, integrating the absolute value of difference of data on each pixel throughout pixels of the two images, is determined. That is, the operation expressed by the following equation (1) is executed.

$$d = \sum_x \sum_y |A_{xy} - B_{xy}| \tag{1}$$

Here, this operation is referred to as a SAD (Sum of Absolute Difference) processing, and the value d obtained through the SAD processing is referred to as a distortion value. The SAD processing is an example of the correlation operation, and the distortion value corresponds to an example of the correlation value referred to in the present invention. The distortion value d implies that as its value is smaller, an extent of approximation of two images $\{A_{xy}\}$ and $\{B_{xy}\}$ is large.

In the color space distortion map plotting unit 10, there are set up two types of color templates named as a fixed template and a temporary template. In an arithmetic unit 11 constituting the color space distortion map plotting unit 10, the SAD processing is carried out between a color separation image constituting the entered original picture image and the respective fixed template and temporary template, using the correlator 80, so that a color space distortion map is plotted. This color space distortion map is an example of a distribution of the "first correlation value" referred to in the present invention. Details of the unit 10 will be given later. In a similar fashion to the matter of the unit 10, with respect to the explanation of the following respective units, first, an outline of the respective unit is simply given, and details of those units will be given later.

In the differential processing unit 20, the entered original picture image is spatially differentiated to plot a differential image. The differential processing unit 20 comprises a differential operational unit 21 for producing a differential image while the correlator 80 takes a partial charge of the differential operation.

In the differential space distortion map plotting unit 30, there are set up a differential template for use in plotting a differential space distortion map and a common template for use in setting up the differential template. In an arithmetic unit 31 constituting the differential space distortion map plotting unit 30, the SAD processing is carried out between the entered differential image and the differential template, using the correlator 80, so that a differential space distortion map is plotted. This differential space distortion map is an example of a distribution of the "second correlation value" referred to in the present invention. In the arithmetic unit 31, when the differential template is set up, the SAD processing is carried out between the entered differential image and the common template, using the correlator 80, so that of the differential image, a partial area to be set up as the differential template is detected and cut out, and the partial area thus cut out is set up as the differential template. The differential space distortion map plotting unit 30 further comprises a differential template renewal unit 32. Inputted to the differential template renewal unit 32 are the differential template thus set up, the differential image and an output of the minimum value position detecting unit 50. In the differential template renewal unit 32, of the differential image, a partial area onto which an initial target after the tracking start is projected is cut out on the basis of the output of the minimum value position detecting unit 50, and the partial area thus cut out is merged with the differential template to produce a new differential template, so that the old differential template is renewed with the new differential template. The differential template renewal unit 32 is an example of the differential template renewal unit referred to in the present invention. A renewal processing of the differential template by the differential template renewal unit 32 is conducted only at the initial stage in which tracking of the target starts, and thereafter the differential template is not renewed and is used for plotting of the differential space distortion map.

The evaluation value map plotting unit 40 comprises a reliability evaluation unit 41, a weighting adding unit 42 and an additional weighting adding unit 43, which correspond to examples of the reliability evaluation unit, the first merge application unit and the second merge application unit referred to in the present invention, respectively.

The reliability evaluation unit 41 evaluates a reliability of the color space distortion map plotted in the color space distortion map plotting unit 10 and a reliability of the differential space distortion map plotted in the differential space distortion map plotting unit 30. Distortion map (distortion map is the general term for the color space distortion map and the differential space distortion map), which is determined that they have reached their associated predetermined reliability, is outputted to the weighting adding unit 42.

The weighting adding unit 42 usually receives both the color space distortion map and the differential space distortion map, which is determined by the reliability evaluation unit 41 that they have reached their associated predetermined reliability, so that those two distortion maps are subjected to a weighting adding for each mutually associated pixels to plot a merged distortion map.

The merged distortion map thus obtained is an example of the "distribution of the merge correlation value" referred to in the present invention. It is acceptable that weightings for the respective distortion maps in the weighting adding unit 42 are fixedly determined beforehand, alternatively it is acceptable that there is provided such an arrangement that weightings for the respective distortion maps are optionally selectable in accordance with types and properties of the original picture image to be entered. The merged distortion map plotted in the weighting adding unit 42 is fed to the additional weighting adding unit 43 and the color template renewal unit 70. As to the color template renewal unit 70, it will be described later. Now the additional weighting adding unit 43 will be described hereinafter.

The additional weighting adding unit 43 receives both the merged distortion map and a motion prediction value map plotted in the motion prediction value map plotting unit 60, so that those two distortion maps are subjected to a weighting adding for each mutually associated pixels to plot a evaluation value map. The evaluation value map thus obtained is an example of the "distribution of the evaluation value" referred to in the present invention. It is acceptable that weightings for the merged distortion map and the motion prediction value map in the weighting adding unit 43 are fixedly determined beforehand, alternatively it is acceptable that there is provided such an arrangement that weightings for the merged distortion map and the motion prediction value map are optionally selectable in accordance with types and properties of the original picture image to be entered, in a similar fashion as to the matter of weightings of the weighting adding unit 42.

Here, the respective pixel values constituting the distortion map are expressed by the above-mentioned distortion value d, which implies that as its value is smaller, an extent of approximation with the template is large. Also with respect to the respective pixel values constituting the prediction value map plotted in the motion prediction value map plotting unit 60, that is, the prediction value, it is determined in such a manner that as the prediction value is smaller, a possibility that the target exists at the position of the associated pixel is increased. Consequently, since the evaluation value map plotted in the evaluation value map plotting unit 40 is equivalent to one obtained through the weighting adding for each mutually associated pixels of two distortion maps and a motion prediction value map, the minimum value position on the evaluation value map is indicative of the position at which the target exists.

The evaluation value map plotted in the weighting adding unit 43 or the evaluation value map plotting unit 40 is fed to the minimum value position detecting unit 50.

The minimum value position detecting unit 50 detects a pixel having the minimum evaluation value from among the entered evaluation value map, and outputs position information of the pixel thus detected as target position information representative of the present position of the target.

The target position information is used, for example, as explained referring to FIG. 1, for controlling a direction of the camera, or for practicing the special processing for the target.

The motion prediction value map plotting unit 60 comprises a next frame prediction motion vector calculating unit 61 and a prediction function generating unit 62. The next frame prediction motion vector calculating unit 61 receives the target position information obtained in the minimum value position detecting unit 50, and calculates a prediction motion vector as to a prediction for the target on the subsequent frame with respect to a translation of the target from the target position represented by the target position information. The prediction motion vector thus obtained is fed to the prediction function generating unit 62 so as to generate a prediction function of predicting on a probability basis a translation of the target on the subsequent frame on its position indicated by the prediction motion vector, and whereby a set of motion prediction values for the respective pixels of the motion prediction value map is determined in accordance with the prediction function thus generated. The motion prediction value constituting the motion prediction value map implies that as its value is smaller, there is a high possibility that the target is translated at the predicted position on the subsequent frame. Thus, the motion prediction value of the smallest value is assigned to a pixel designated by the prediction motion vector obtained in the next frame prediction motion vector calculating unit 61. The motion prediction value map corresponds to an example of the "distribution of the motion prediction value" referred to in the present invention.

The motion prediction value map plotted in the motion prediction value map plotting unit 60 is fed, as mentioned above, to the additional weighting adding unit 43 and is subject to the weighting adding between it and the merged distortion map produced in the weighting adding unit 42.

The color template renewal unit 70 comprises an approximation object detecting unit 71 and an evaluation/merger unit 72, which correspond to examples of the approximation object detecting unit and the evaluation/merger unit referred to in the present invention, respectively. The approximation object detecting unit 71 comprises a minimum value position detecting unit 71a and an interference object monitor unit 71b.

The merged distortion map produced in the weighting adding unit 42 constituting the evaluation value map plotting unit 40 is fed, as mentioned above, to the additional weighting adding unit 43 and also to the color template renewal unit 70. The merged distortion map fed to the color template renewal unit 70 is supplied to the minimum value position detecting unit 71a constituting the color template renewal unit 70.

The minimum value position detecting unit 71a detects a position of the minimum value of the merged distortion map. The position of the minimum value is interpreted that it is presumed that the approximation object approximated to the target exists at the position of the minimum value. It is not always that a single position of the minimum value is detected, but it may happen that a plurality of positions of the minimum value are detected. While the minimum value position detecting unit 71a may detect the true target itself, the position of the true target is detected by the minimum value position detecting unit 50 and then fed to the evaluation/merger unit 72 so as to distinguish the true target from the approximation object. Thus, it involves no problem that the minimum value position detecting unit 71a detects also the true target itself.

The interference object monitor unit 71b determines whether the approximation object approximated to the target exists at the position of the minimum value detected by the minimum value position detecting unit 71a in accordance with a variation of the distortion value in the vicinity of the minimum value position of the color space distortion map. Where the approximation object is addressed also as an interference object in the meaning that the approximation object interferes with the target, or interferes with a position detection of the target.

The evaluation/merger unit 72 receives position information of the interference object detected by the interference object monitor unit 71b and position information of the target detected by the minimum value position detecting unit 50 to evaluate whether the temporary template is to be altered taking into account the temporary template now set up, the image of the target and the image of the interference object. When it is decided that the temporary template is altered, the image of the present target cut out from the color separation image is merged with the temporary template now set up, and thereby the temporary template is renewed to a merged temporary template.

Next, there will be explained operations of the respective elements constituting the moving-target tracking apparatus shown in FIG. 2, hereinafter.

Figures 3, 4A, 4B, 4C, 4D:
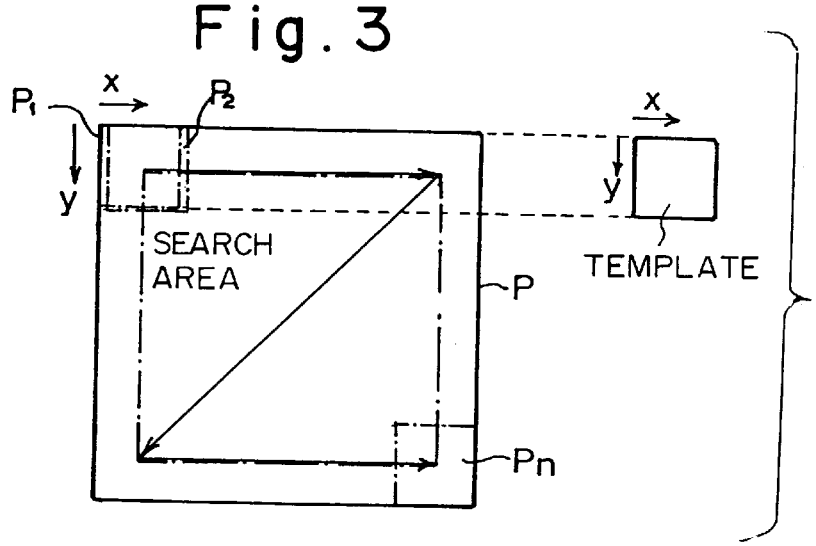
FIG. 3 is an illustration useful for understanding a plotting process of a color space distortion map.
FIGS. 4(A), 4(B), 4(C) and 4(D) are illustrations each showing a differential filter or a template.

FIG. 3 is an illustration useful for understanding a plotting process of a color space distortion map. Prior to the explanation of a scheme of setting up the fixed template and the temporary template constituting the color template, here, the plotting process of the color space distortion map will be explained assuming that the fixed template and the temporary template have been already set up.

According to the present embodiment, an original picture image to be inputted consists of three colors of R(red), G(green) and B(blue), that is, three types of color separation images. Thus, with respect to each of the fixed template and the temporary template, three types of ones are set up for each template in association with three color separation images of three colors of R, G and B, respectively. Consequently, in the middle stage of the plotting process of the color space distortion map, the SAD processing between the three types of color separation images and the fixed templates separately set up in the associated colors respectively is practiced to plot three color space distortion maps, and the SAD processing between the three types of color separation images and the temporary templates separately set up in the associated colors respectively is practiced to plot three color space distortion maps. Thereafter, the six color space distortion maps thus plotted are averaged for each associated pixels into a merged color space distortion map. The color space distortion map plotting unit 10 outputs the merged color space distortion map thus obtained and transfers the same to the evaluation value map plotting unit 40. Incidentally, in the explanation of FIG. 3, typically, the SAD processing between a single color separation image and a single template will be explained.

A search area is set up in the color separation image on the position, at which the target is deemed to be translated in the subsequent frame, on the basis of information of the prediction motion vector obtained in the next frame prediction motion vector calculating unit 61 constituting the motion prediction value map plotting unit 60, and distortion values each corresponding to the associated one of pixels within the search area are determined. In order to implement this operation, a cut-out area P (shown in FIG. 3) larger than the search area is set up within the color separation image, and segment areas $P_1, P_2, \ldots, P_n$ are sequentially cut out from among the cut-out area P. Here, first, the segment area $P_1$ having the same figure as the template is cut away taking the uppermost and left end corner of the cut-out area P as an apex, and the SAD processing by the correlator 80, that is, the operation shown in the above-mentioned equation (1) is performed between the segment area $P_1$ thus cut out and the template, so that a distortion value d is determined. The distortion value d thus determined is associated with the central pixel of the segment area $P_1$. As a matter of convenience of the explanation, hereinafter, the processing in which a value determined by the SAD processing is associated with a pixel is inclusively addressed as the SAD processing.

Next, the segment area $P_2$, which is shifted by the corresponding pixel from the first segment area $P_1$ in a direction x, is cut out and the SAD processing is practiced between the newly cut segment area $P_2$ and the template.

This process is repeatedly performed, and when the process reaches the last right end of the cut-out area P, then the process returns to the left end, and a segment shifted by the corresponding pixel from the first segment area $P_1$ in a direction y is cut out, and the similar SAD processing is practiced between the newly cut segment area and the template. In a similar fashion as to the matter of the above-mentioned processing, the subsequent segments are sequentially cut out shifting one by one by the corresponding pixel in the direction x, and the SAD processing is practiced whenever the subsequent segment is cut out. These processes are repeatedly performed, and finally the lowermost and last right end corner of segment area $P_n$ is cut out, and the SAD processing is practiced between the segment area $P_n$ and the template.

A series of SAD processings as mentioned above makes it possible to plot a two-dimensional map having the distortion values each corresponding to the associated pixel of the search area P, that is, the color space distortion map.

As mentioned above, the color space distortion map plotting unit 10 temporarily plots 6 color space distortion maps in the manner mentioned above, and then merges them into a single color color space distortion map through averaging the 6 color space distortion maps for each associated pixels. However, as will be described later, it happens that only the temporary template is used and the fixed template is not used. In such a case, 3 color space distortion maps plotted using only the temporary template are merged into a single color color space distortion map.

FIGS. 4(A), 4(B), 4(C) and 4(D) are illustrations each showing a differential filter or a template, or a process of a differential processing in the differential processing unit 20.

The differential processing unit 20 receives an original picture image. According to the present embodiment, upon receipt of the original picture image, first, the differential processing unit 20 eliminates information as to color from three colors (R, G, B) of color separation images, and produces a black and white original picture image having only information as to brightness (luminance, density), and practices the spatial differentiation on the produced black and white original picture image so as to produce a differential image corresponding to the black and white original picture image. Hereinafter, the black and white picture image may be simply referred to as an image.

FIG. 4(A) is an illustration showing an example of a y-direction differential filter for differentiating an image in a y-direction. FIG. 4(B) is an illustration showing an example of an x-direction differential filter for differentiating an image in an x-direction.

Those differential filters are superimposed on segment areas of an original image. Pixel values of pixels of the superimposed original image and pixel values of pixels of the filters are multiplied by one another for each associated pixels, multiplication results are added throughout the superimposed area, and an operation that a addition result of the multiplication results is associated with the central pixel of the superimposed area is executed while the superimposed area is sequentially altered. This feature permits the original image to be differentiated in the y-direction when the y-direction differential filter is used, and in the x-direction when the x-direction differential filter is used.

The differential processing unit 20 performs the same operation using the correlator 80. That is, the differential filters shown in FIGS. 4(A) and 4(B) are not used, but two templates shown in FIGS. 4(C) and 4(D) are used to perform the SAD processing (including a mapping process of the value with the central pixel) as explained referring to FIG. 3. Thereafter, the differential operational unit 21 determines through the following operation an x-direction differential image in which the original image is differentiated in the x-direction, and an y-direction differential image in which the original image is differentiated in the y-direction. That is, when pixel values of the respective pixels of the image obtained through the SAD processing by the use of a template 1 shown in FIG. 4(C) is expressed by $F_s$ (x, y); pixel values of the respective pixels of the image obtained through the SAD processing by the use of a template 2 shown in FIG. 4(D) is expressed by $F_{ss}$ (x, y); pixel values of the respective pixels of the y-direction differential image is expressed by $\Delta P_y$ (x, y); and pixel values of the respective pixels of the x-direction differential image is expressed by $\Delta P_x$ (x, y), the differential operational unit 21 performs the following operations.

$$\Delta P_y (x, y) = F_s (x, y+1) - F_s (x, y-1) \quad (2)$$

$$\Delta P_x (x, y) = F_{ss} (x+1, y) - F_{ss} (x-1, y) \quad (3)$$

These operations are equivalent to the differential operations using the differential filters shown in FIGS. 4(A) and 4(B).

In the differential operational unit 21, of the pixel values of these two differential images {$\Delta P_y$ (x, y)} and $\Delta P_y$ (x, y)}, the larger pixel value is adopted to produce a single differential image.

In the differential space distortion map plotting unit 30, the same SAD processing as the color space distortion map plotting unit 10, except for the difference that the cut-out area D shown in FIG. 3 is replaced by the cut-out area set up in the differential image, and the template shown in FIG. 3 is replaced by the differential template, is performed to plot the differential space distortion map. It is noted that the differential processing unit 20 produces a single type of differential image, so that only a single type of differential space distortion map is produced. In the differential space distortion map plotting unit 30, it happens that the common template is used as the template for practicing the SAD processing.

Incidentally, in a similar fashion as to the matter of the explanation of the color space distortion map plotting unit 10, it is assumed that the differential template and the common template have been already set up.

FIG. 5 is an explanatory view useful for understanding an operation of the reliability evaluation unit 41 constituting the evaluation value map plotting unit 40.

As described above, the reliability evaluation unit 41 receives the color space distortion map (it is denoted by $D_1$) plotted in the color space distortion map plotting unit 10 and the differential space distortion map (it is denoted by $D_2$) plotted by the differential space distortion map plotting unit 30. Upon receipt of these maps $D_1$ and $D_2$, the reliability evaluation unit 41 refers to these two maps $D_1$ and $D_2$ (step 5_1) to determine the minimum values $D_{1min}$ and $D_{2min}$ of the two distortion maps $D_1$ and $D_2$, respectively (step 5_2). In FIG. 5, in order to demonstrate clearly that the two distortion maps $D_1$ and $D_2$, and their respectively associated minimum values $D_{1min}$ and $D_{2min}$ are determined for each frame, that is, they are functions of time t, the distortion maps $D_1$ and $D_2$, and their respectively associated minimum values $D_{1min}$ and $D_{2min}$ are expressed by $D_1$ (t), $D_2$ (t), $D_{1min}$ (t) and $D_{2min}$ (t), respectively.

In step 5_3, the minimum values $D_{1min}$ and $D_{2min}$ are compared with predetermined threshold values TH1 and TH2, respectively.

Here, $D_{1min}$>TH1 implies that the reliability of the color space distortion map is low, and $D_{2min}$>TH2 implies that the reliability of the differential space distortion map is low.

As a result of the comparison in the step 5_3, when it is decided that $D_{1min}$>TH1 and $D_{2min}$>TH2, that is, both the distortion maps $D_1$ and $D_2$ are low in the reliability, the process goes to a step 5_4 in which the subsequent tracking for the target is stopped.

As a result of the comparison in the step 5_3, when it is decided that $D_{1min}$≦TH1 and $D_{2min}$>TH2, that is, of the two distortion maps $D_1$ and $D_2$, only the differential space distortion map $D_2$ is low in the reliability, the process goes to a step 5_5 in which the differential space distortion map $D_2$ is neglected, and only the color space distortion map $D_1$ is fed to the weighting adding unit 42. In this case, the differential space distortion map $D_2$ is not fed to the weighting adding unit 42. Consequently, the weighting adding is not performed, and thus the entered color space distortion map $D_1$ is outputted from the weighting adding unit 42 in the form of the merged distortion map as it is.

As a result of the comparison in the step 5_3, when it is decided that $D_{1min}$>TH1 and $D_{2min}$≦TH2, that is, of the two distortion maps $D_1$ and $D_2$, only the color space distortion map $D_1$ is low in the reliability, the process goes to a step 5_6 in which the color space distortion map $D_1$ is neglected, and only the differential space distortion map $D_2$ is fed to the weighting adding unit 42. In this case, the color space distortion map $D_1$ is not fed to the weighting adding unit 42. Consequently, the weighting adding is not performed, and thus the entered differential space distortion map $D_2$ is outputted from the weighting adding unit 42 in the form of the merged distortion map as it is.

As a result of the comparison in the step 5_3, when it is decided that $D_{1min}$≦TH1 and $D_{2min}$≦TH2, the process goes to a step 5_7 in which both the distortion maps $D_1$ and $D_2$ are fed to the weighting adding unit 42 so as to be subjected to the weighting adding for each associated pixels.

Figure 6A:
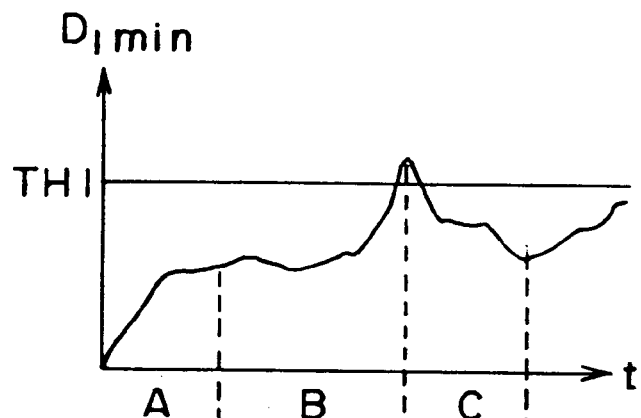
FIGS. 6(A), 6(B) and 6(C) are views showing a variation in time of the minimum value $D_{1min}$ of a distortion map $D_1$, a variation in time of the minimum value $D_{2min}$ of a distortion map $D_2$, and a variation in time as to whether the two distortion maps $D_1$ and $D_2$ are to be used for the later processing, or whether they are of high reliability.
Figure 6B:
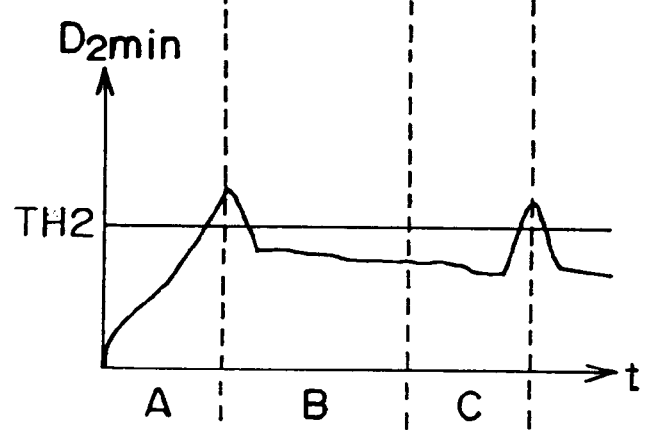
Figure 6C:
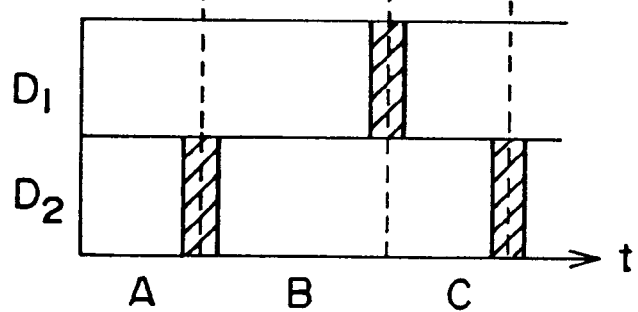

FIGS. 6(A), 6(B) and 6(C) are views showing a variation in time of the minimum value $D_{1min}$ of a distortion map $D_1$, a variation in time of the minimum value $D_{2min}$ of a distortion map $D_2$, and a variation in time as to whether the two distortion maps $D_1$ and $D_2$ are to be used for the later processing, or whether they are of high reliability.

FIG. 6(A) is a view showing a variation in time of the minimum value $D_{1min}$ of the color space distortion map $D_1$, in which the minimum value $D_{1min}$ exceeds the threshold value TH1 between a time region B and a time region C.

FIG. 6(B) is a view showing a variation in time of the minimum value $D_{2min}$ of the differential space distortion map $D_2$, in which the minimum value $D_{2min}$ exceeds the threshold value TH2 between a time region A and the time region B, and after the time region C.

When the situations as shown in FIGS. 6(A) and 6(B) are concerned, either the distortion map $D_1$ or the distortion map $D_2$ is neglected in the hatched time regions shown in FIG. 6(C), in other words, the distortion map $D_1$ or the distortion map $D_2$ is not fed to the weighting adding unit 42.

While there has been explained above an example that both the color space distortion map and the differential space distortion map are dealt with on equal terms to evaluate the reliability on both the distortion maps, it is acceptable, in view of the fact that as compared with those two distortion maps, generally the color space distortion map is lower in the reliability, to provide such an arrangement that the reliability evaluation unit 41 evaluates only the reliability of color space distortion map and transfers the differential space distortion map to the weighting adding unit 42 without any evaluation process.

Figure 7:
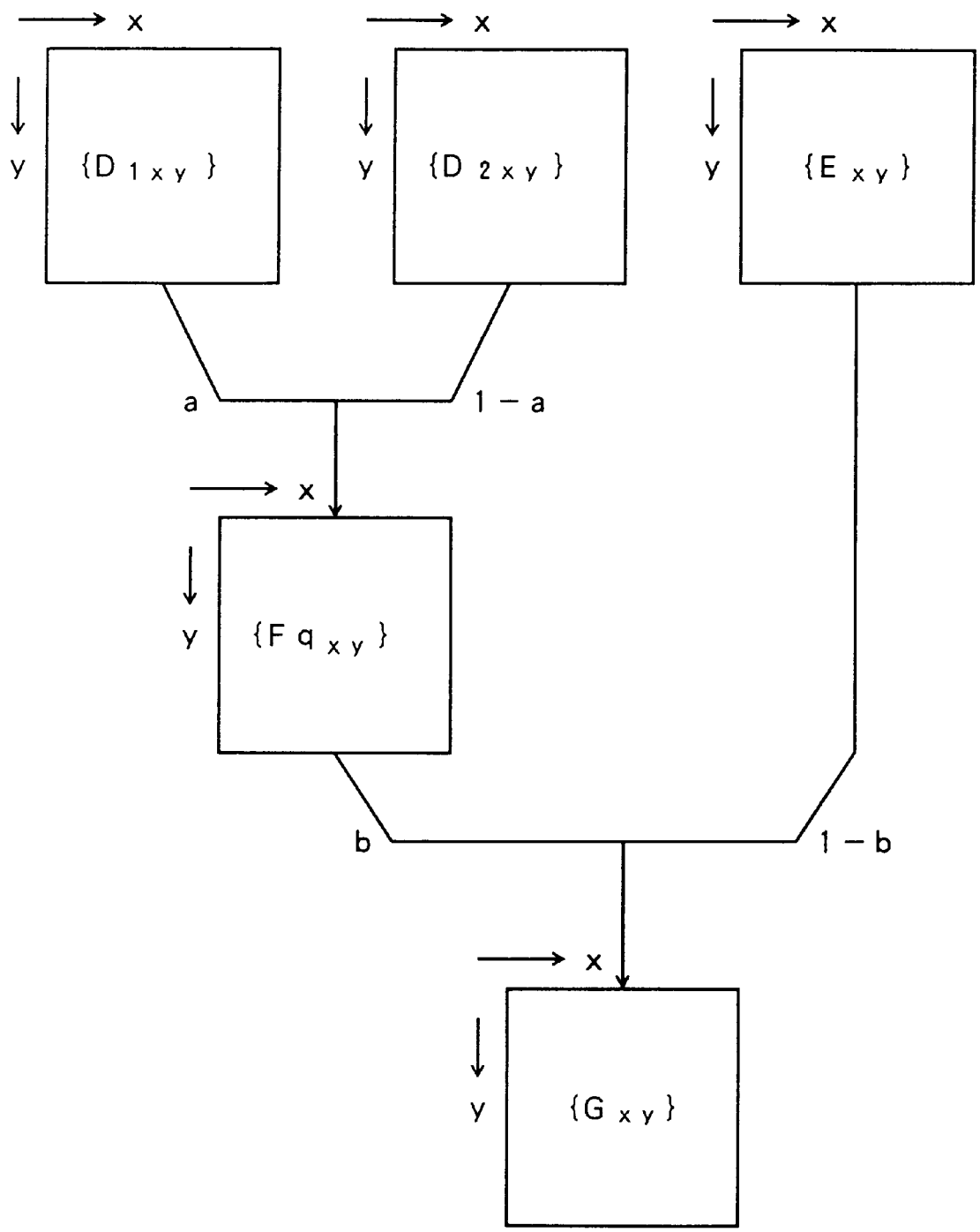
FIG. 7 is an explanatory view useful for understanding the functions of two weighting adding units.

FIG. 7 is an explanatory view useful for understanding the functions of two weighting adding units 42 and 43 constituting the evaluation value map plotting unit 40. It is assumed that the reliability evaluation unit 41 generates both the color space distortion map $D_1$ and the differential space distortion map $D_2$ and transmits the same to the weighting adding unit 42.

In FIG. 7, the color space distortion map $D_1$ is expressed by a set $\{D_{1xy}\}$ of pixel values $D_{1xy}$ of the respective pixels (x, y) of the color space distortion map $D_1$, and likely, the differential space distortion map $D_2$ is expressed by a set $\{D_{2xy}\}$, and the motion prediction value map plotted in the motion prediction value map plotting unit 60 is expressed by a set $\{E_{xy}\}$.

Of the two weighting adding units 42 and 43, the pre-stage of weighting adding unit 42 performs the weighting adding for the two distortion maps $\{D_{1xy}\}$ and $\{D_{2xy}\}$ for each associated pixels to produce a merged distortion map $\{F_{xy}\}$. That is, the weighting adding unit 42 performs the following operation for each pixel.

$$F_{XY}=a \times D_{1xy}+(1-a) \times D_{2XY} \quad (4)$$

Where a is a positive value below 1, and a and 1−a denote weight.

The another weighting adding unit 43 receives the merged distortion map $\{F_{xy}\}$ obtained through the operation shown in the equation (4) in the weighting adding units 42, and the motion prediction value map $\{E_{xy}\}$, and performs the weighting adding for those two maps $\{F_{xy}\}$ and $\{E_{xy}\}$ for each associated pixels to produce an evaluation value map $\{G_{xy}\}$. That is, the weighting adding unit 43 performs the following operation for each pixel.

$$G_{xy}=b \times F_{1xy}+(1-b) \times E_{xy} \quad (5)$$

Where b is a positive value below 1, and b and 1−b denote weight.

Thus obtained evaluation value map $\{G_{xy}\}$ is fed to the minimum value position detecting unit 50. The minimum value position detecting unit 50 determines a position of a pixel having the minimum value $G_{min}$ of the pixel values $G_{xy}$ of the pixels constituting the evaluation value map $\{G_{xy}\}$. Here, the operation of the minimum value position detecting unit 50 is simply involved in the matter such that the minimum value $G_{min}$ of the pixel values $G_{xy}$ of the pixels constituting the evaluation value map $\{G_{xy}\}$ is detected and the position of the pixel having the minimum value $G_{min}$ is determined. Therefore, an additional explanation of the minimum value position detecting unit 50 is omitted.

Figure 8:
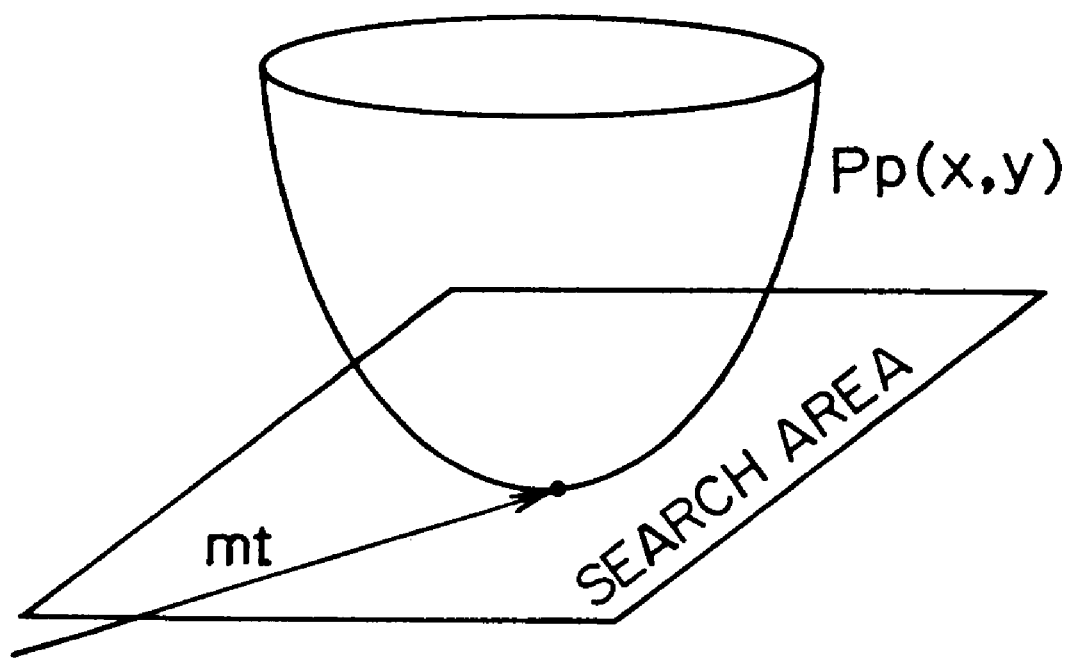
FIG. 8 is an explanatory view useful for understanding an operation of a motion prediction map plotting unit.

FIG. 8 is an explanatory view useful for understanding an operation of the motion prediction map plotting unit 60.

The next frame prediction motion vector calculating unit 61, which constitutes the motion prediction map plotting unit 60, determines a prediction motion vector $m_t$ of predicting the motion of the target between the present frame t and the subsequent frame t+1 in the manner set forth below.

When a prediction motion vector determined as to the previous frame t−1 in a similar fashion is expressed by $m_{t-1}$, and a motion vector indicative of the actual motion of the target between the last frame t−1 and the present frame t is expressed by $v_t$, the prediction motion vector $m_t$ of predicting the motion of the target between the present frame t and the subsequent frame t+1 is determined by the following operation.

$$m_t=(v_t+4 \cdot m_{t-1})/5 \quad (6)$$

The motion vector $v_t$ indicative of the actual motion of the target between the last frame and the present frame is a vector directed from the target position determined by the minimum value position detecting unit 50 with respect to the last frame toward the target position determined with respect to the present frame in a similar fashion. Here, weights for $v_t$ and $m_{t-1}$ are give by ⅕ and ⅘, respectively. But it is acceptable that other weights are adopted.

As seen from the equation (6), the subsequent motion prediction vector is determined on the basis of the past motion vector and the past prediction motion vector, and the past prediction motion vector includes the further past information. Accordingly, the adoption of the equation (6) makes it possible to determine the prediction motion vector giving a comprehensive survey of past pieces of information.

The prediction motion vector $m_t$, which is determined in accordance with the equation (6) in the next frame prediction motion vector calculating unit 61, is fed to the prediction function generating unit 62. According to the present embodiment, the prediction function generating unit 62 determines motion prediction values each corresponding to the associated pixel on the search area in accordance with a motion prediction function $P_{p(x, y)}$ defined by the following equation (7).

$$P_{p(x, y)}=(x^2+y^2) \cdot (1+\alpha \cdot |m_t|) \quad (7)$$

where α is weight having a positive value

The equation (7) is associated with a parabola shape. As the magnitude $|m_t|$ of the prediction motion vector $m_t$ is larger, the parabola shape is of sharper. It is noted that the apex of the parabola shape is coincident with the target position (the existing prediction position referred to in the present invention) on the subsequent frame, which is predicted by the prediction motion vector $m_t$.

In this manner, the motion prediction values each corresponding to the associated pixel on the search area are determined in accordance with the motion prediction function $P_{p(x, y)}$ defined by the equation (7), and the motion prediction map is produced as a set of the motion prediction values.

While the above-mentioned embodiment is concerned with the example in which the motion prediction values are functions of distances on the predicted target position, and vary in accordance with the magnitude $|m_t|$ of the prediction motion vector $m_t$, it is acceptable that the sharpness of the parabola, which is the function indicative of the motion prediction values, is varied in accordance with a direction of the prediction motion vector $m_t$ and a direction perpendicularly intersecting the former direction.

FIGS. 9(A), 9(B), 9(C) and 9(D) are explanatory views useful for understanding the function of an approximate object detecting unit 71 constituting the color template renewal unit 70. Here, the above-mentioned three (R,G,B) color separation images are addressed uniformly as color separation images without any distinctions thereamong, and the templates each corresponding to the associated color separation image are addressed uniformly as templates without any distinctions thereamong.

FIG. 9(A) is the view showing a target position (position shown by slanting lines in FIG. 9(A)) in the color separation area, the target position being detected by the minimum value position detecting unit 50, and an image area A on the target position, the image area A having the same size as the template.

FIG. 9(B) is the view showing minimum value positions (positions shown by slanting lines in FIG. 9(B)) detected by the minimum value position detecting unit 71a constituting the color template renewal unit 70, and image areas A, B, C, and D provided on the target positions, respectively, each of the image areas A, B, C, and D having the same size as the template. According to the present embodiment, the minimum value position detecting unit 71a detects four minimum value positions including the target position detected by the minimum value position detecting unit 50.

The illustration shown in FIG. 9(B) implies, in connection with the explanation for the interference object monitor unit 71b, the merged distortion map produced in the weighting adding unit 42, and implies, in connection with the explanation for the evaluation/merger unit 72, the color separation image. But the illustrations of the image areas A, B, C, and D have no meaning in connection with the merged distortion map.

The interference object monitor unit 71b applies a filter shown in FIG. 9(C), in connection with the four minimum value positions detected by the minimum value position detecting unit 71a, to the respective minimum value positions on the merged distortion map. The way of applying of the filter to the minimum value positions is the same as that of the differential filter explained referring to FIG. 4(A). Thus, the redundant explanation will be omitted.

The filter shown in FIG. 9(C) serves, as shown in FIG. 9(D), to extract a difference (depth) between the pixel value (typically shown by the circle mark ○ in FIG. 9(D)) of the minimum value position and the pixel values (typically shown by marks X in FIG. 9(D)). The depth is compared with a predetermined threshold. When the depth is larger than the threshold, it is decided that an interference object interfered with the target exists at the minimum value position. Here, it is assumed that it has been decided that the interference objects exist at the minimum value positions on the image areas B and C shown in FIG. 9(B), respectively, and no interference object exists at the minimum value position on the image area D shown in FIG. 9(B).

Figure 10:
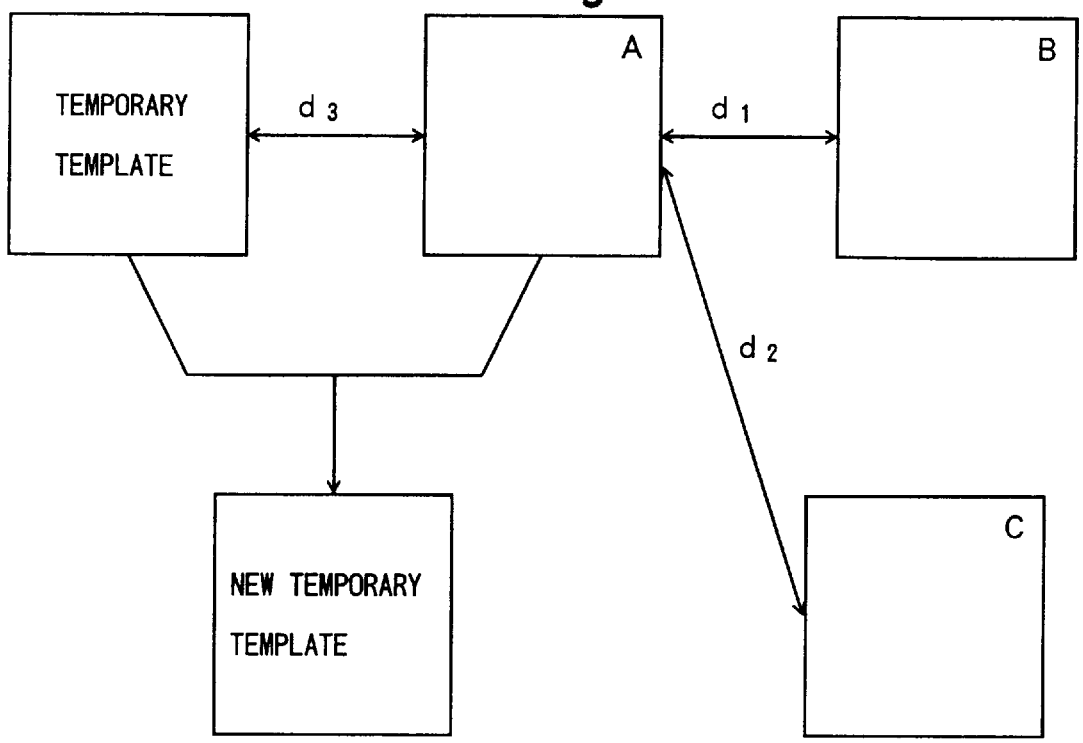
FIG. 10 is an explanatory view useful for understanding the function of an evaluation and merger unit.

FIG. 10 is an explanatory view useful for understanding the function of an evaluation and merger unit 72 constituting the color template renewal unit 70.

In the evaluation and merger unit 72, the operation shown in the above-mentioned equation (1) is performed between the image area A on the target position detected by the minimum value position detecting unit 50, the image area A having the same size as the template on the color separation image, and image areas B and C on the minimum value position involved in the existence of the approximate object (interference object), detected by the approximate object detecting unit 71, each of the image areas B and C having the having the same size as the template on the color separation image, respectively to determine distortion values $d_1$ and $d_2$. These distortion values $d_1$ and $d_2$ correspond to the second approximate degree referred to in the present invention. In a similar fashion, the operation shown in the above-mentioned equation (1) is performed between the temporary template and the image area A to determine a distortion value $d_3$. This distortion value $d_3$ corresponds to the first approximate degree referred to in the present invention. Next, the distortion values thus determined are compared with each other. When the distortion value $d_3$ is smaller than any of the distortion values $d_1$ and $d_2$, pixel values of the respective pixels of the temporary template and pixel values of the respective pixels of the image area A are averaged for each associated pixels to determine a new temporary template, so that the old temporary template is replaced by the new temporary template. In this manner, the temporary template is sequentially renewed. According to the present embodiment, only in the event that the distortion value $d_3$ is smaller than both the distortion values $d_1$ and $d_2$, the temporary template is renewed. Thus, the renewed temporary template sensitively reacts on the target, while a degree of reaction to the interference object is reduced. Accordingly, it is possible to implement a stable track for the target with distinction from the interference object.

Next, there will be explained setting up schemes for the differential template and the fixed template, and an initial setting up scheme for the temporary template.

Figure 11:
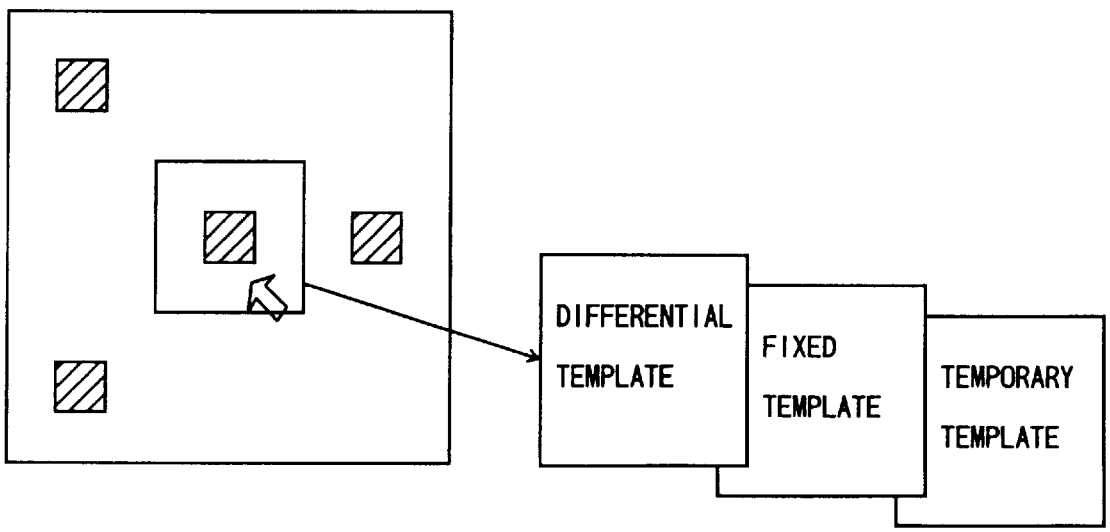
FIG. 11 is an explanatory view useful for understanding a first example of a setting up scheme for templates.

FIG. 11 is an explanatory view useful for understanding a first example of a setting up scheme for templates.

An original picture image including a moving-target object intended to be designated as a target is displayed on the CRT display unit 104, and the mouse 103 is operated to indicate a desired moving-target object of the original picture image. Then, position information on the original picture image indicated is fed together with the original picture image to the moving-target tracking apparatus shown in FIG. 2. The arithmetic unit 11 constituting the color space distortion map plotting unit 10 cuts out an image area on the original picture image, with the position indicated by the mouse 103 as the center, the image area cut out having the same size as the template, and sets up the image area cut out as the fixed template and also as the temporary template in the form of the initial setting up. At the same time, the arithmetic unit 31 constituting the differential space distortion map plotting unit 30 cuts out an image area on the differential image, with the position indicated by the mouse 103 as the center, the image area cut out having the same size as the template, and sets up the image area cut out as the differential template.

Figure 12:
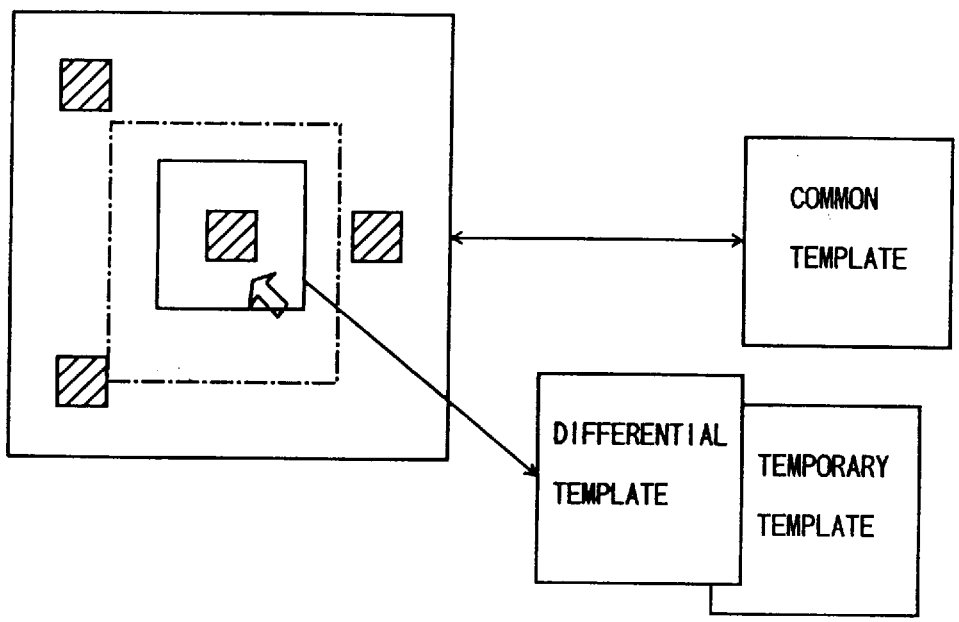
FIG. 12 is an explanatory view useful for understanding a second example of a setting up scheme for templates.

FIG. 12 is an explanatory view useful for understanding a second example of a setting up scheme for templates.

In the moving-target tracking apparatus shown in FIG. 2, a common template is set up to detect any types of moving-target object as far as they are concerned with a possibility that they are designated as a target. The common template is manually set up beforehand. In the second example of a setting up scheme for templates, such a common template is used.

An original picture image including a moving-target object intended to be designated as a target is displayed on the CRT display unit 104, and the mouse 103 is operated to indicate a desired moving-target object. At that time, a dynamic picture image is displayed on the CRT display unit 104. Thus, it may happen that a moving-target object intended to be designated as a target is moving, and it is not always that a position of the target is exactly designated. For this reason, according to the second example of a setting up scheme, the arithmetic unit 31 constituting the differential space distortion map plotting unit 30 sets up an area (shown in FIG. 12 with a dashed line) larger than the template on the differential image, with the designated position as the center, and performs the SAD processing with the common template within the area thus set up to detect a minimum value position, and then cuts out an image area, on the detected minimum value position, having the same size as the template, so that the image area thus cut out is set up as the differential template. The arithmetic unit 11 constituting the color space distortion map plotting unit 10 receives information as to the minimum value position from the arithmetic unit 31 constituting the differential space distortion map plotting unit 30, and cuts out an image area on the color separation image, with the minimum value position as the center, the image area cut out having the same size as the template, and sets up the image area thus cut out as the fixed template and also as the temporary template in the form of the initial setting up.

Figure 13:
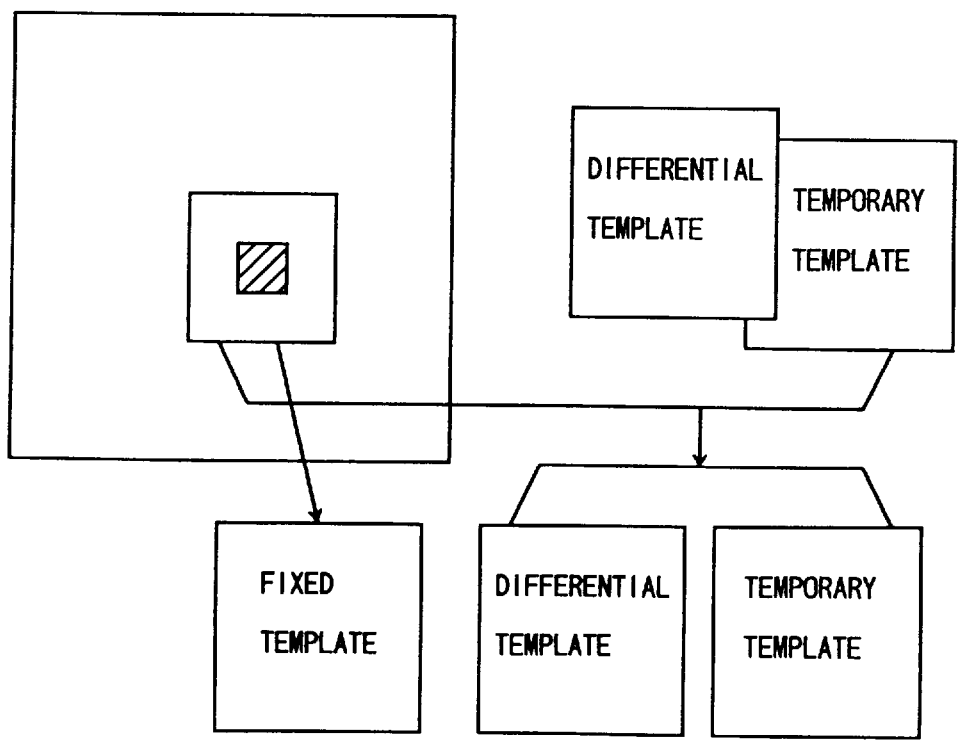
FIG. 13 is an explanatory view useful for understanding a third example of a setting up scheme for templates.

FIG. 13 is an explanatory view useful for understanding a third example of a setting up scheme for templates. The processing, which will be explained referring to FIG. 13, is continued from the processing explained referring to FIG. 12. It is noted that the fixed template is not yet set up at the stage of the processing explained referring to FIG. 12, but only the differential template and the temporary template are set up.

In this condition, tracking of the target is started. But, in the color space distortion map plotting unit 10, since the fixed template is not yet set up, only the temporary template is used.

In this manner, when the target position is detected by the minimum value position detecting unit 50, information as to the detected target position is fed to the differential template renewal unit 32 constituting the differential space distortion map plotting unit 30. It is assumed that the position shown in FIG. 13 with slanting lines is the target position detected by the minimum value position detecting unit 50. The differential template renewal unit 32 cuts out an image area on the target position detected by the minimum value position detecting unit 50, the image area having the same size as the template, averages the image area thus cut out and the differential template already set up for each associated pixels to determine a new differential template, and the old differential template is replace by the new differential template. The temporary template is renewed by the color template renewal unit 70. The above-mentioned renewal processing is repeated by a predetermined number of frames, and thereafter the differential template renewal unit 32 stops in its operation. Thus, thereafter the differential template is not renewed and is fixed. On the other hand, the temporary template is continuously renewed by the color template renewal unit 70.

With respect to the fixed template, information as to the target position detected by the minimum value position detecting unit 50, immediately before the differential template renewal unit 32 stops in its operation, is transmitted from the differential template renewal unit 32 to the arithmetic unit 11 constituting the color space distortion map plotting unit 10. The arithmetic unit 11 cuts out an image area on the color separation image, on the target position at that time, having the same size as the template, so that the image area thus cut out is set up as the fixed template.

The moving-target tracking apparatus shown in FIG. 2 is implemented inside the computer system shown in FIG. 1, and is constructed with a software but the correlator 80. Even such an arrangement of the moving-target tracking apparatus on the software basis makes it possible to remarkably ensure an operational ability on a real-time basis. Alternatively, the moving-target tracking apparatus shown in FIG. 2 can be implemented with a hardware. An arrangement of the moving-target tracking apparatus on the hardware basis makes it possible to further improve an operational ability on a real-time basis. Further, according to the moving-target tracking apparatus shown in FIG. 2, various types of information which a target is provided with are taken in and merged in the form of a two-dimensional map so as to detect a target position. This feature makes it possible to cope with a large transformation of a target, and also to track a target with an accuracy free from the problem on a practical use.

FIG. 14 is a schematic diagram showing a moving-target tracking apparatus according to an alternative embodiment of the present invention.

Picture images photographed by a camera 100 are successively received on a real-time basis through an input means 201 of a moving-target tracking apparatus 200 into a moving-target tracking means 202 in which the picture images are subjected to a tracking processing. The content of the moving-target tracking means 202 corresponds to a whole of the apparatus shown in FIG. 2, which have been described above. A mark generating means 203 forms a predetermined elliptical mark (longer than is wide) on a moving-target object position which is subjected to an operation in the moving-target tracking means 202. The mark generated in the mark generating means 203 is combined with the image photographed by the camera 100 through a telop display unit 300, and then transmitted to a broadcasting apparatus 400.

An image transmitted from the broadcasting apparatus 400 is received by a set, for example, a television set (not illustrated), and is displayed on a display screen of the television set. On the image displayed on the screen, the elliptic mark is appended to a moving-target object. Thus, it is possible for an operator to always notice the moving-target object, when it is moved, without losing sight of it.

As described above, according to the present invention, it is possible to implement a moving-target tracking apparatus contributing to an improvement of an operational ability on a real-time basis and a tracking performance.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A moving-target tracking apparatus wherein an original picture image, which consists of a plurality of frames sequentially continued, photographed with a scene including at least one moving object, is inputted and a moving-target selected from among moving objects projected on the original picture image is tracked, said moving-target tracking apparatus comprising:

a first correlation value distribution operational unit for determining a distribution of a first correlation value between a color template to be compared with the moving-target projected on a color separation image constituting the original picture image, and the color separation image;

a differential processing unit for spatially differentiating the original picture image to determine a differential image;

a second correlation value distribution operational unit for determining a distribution of a second correlation value between a differential template to be compared with the moving-target projected on the differential image, and the differential image;

a motion prediction value distribution operational unit for determining a distribution of a motion prediction value representative of a probability of existence of the moving-target in accordance with a past motion of the moving-target;

an evaluation value distribution operational unit for determining an evaluation value through merging the first correlation value, the second correlation value and the motion prediction value to determine a distribution of the evaluation value representative of an existing position of the moving-target; and a position detecting unit for detecting the existing position of the moving-target in accordance with the distribution of the evaluation value determined in said evaluation value distribution operational unit.

2. A moving-target tracking apparatus according to claim 1, wherein said evaluation value distribution operational unit includes a reliability evaluation unit for evaluating a reliability of the distribution of the first correlation value, and determines the distribution of the evaluation value upon eliminating the distribution of the first correlation value, which is evaluated as low in the reliability, from a processing for determining the distribution of the evaluation value.

3. A moving-target tracking apparatus according to claim 1, wherein said evaluation value distribution operational unit includes a reliability evaluation unit for evaluating a reliability of the distribution of the first correlation value and a reliability of the distribution of the second correlation value, and determines the distribution of the evaluation value upon eliminating the distribution of the first correlation value, which is evaluated as low in the reliability, and the distribution of the second correlation value, which is evaluated as low in the reliability, from a processing for determining the distribution of the evaluation value.

4. A moving-target tracking apparatus according to claim 1, wherein said color template includes a temporary template to be sequentially renewed, and said moving-target tracking apparatus further comprises a color template renewal unit for merging an image area on the color separation image, including the existing position of the moving-target detected by said position detecting unit, with the temporary template to renew the temporary template.

5. A moving-target tracking apparatus according to claim 4, wherein said evaluation value distribution operational unit comprises:

a first merge application unit for determining a merge correlation value for each pixel through merging the first correlation value with the second correlation value for each pixel to determine a distribution of the merge correlation value; and a second merge application unit for determining an evaluation value for each pixel through merging the merge correlation value determined in said first merge application unit with the motion prediction value determined in said motion prediction value distribution operational unit for each pixel to determine the distribution of the evaluation value, and wherein said color template renewal unit comprises:

an approximation object detecting unit for detecting existing positions of an approximation object approximated to the moving-target in accordance with the merge correlation value; and an evaluation/merger unit for renewing the temporary template in such a manner that a first approximation degree representative of an extent of an approximation between a first image area on the color separation image, including the existing position of the moving-target detected by said position detecting unit, and the temporary template, and a second approximation degree representative of an extent of an approximation between the first image area and a second image area including an existing position of the approximation object detected by said approximation object detecting unit, are detected, and in the event that the first approximation degree is larger than the second approximation degree, the first image area is merged with the temporary template.

6. A moving-target tracking apparatus according to claim 1, further comprising a correlator for determining a correlation value integrating the absolute value of difference of pixel values assigned to mutually associated pixels of two images or image areas, throughout the two images or image areas, said correlator being used on a common basis for said first correlation value distribution operation unit and said second correlation value distribution operation unit, alternatively, being individually provided for each of said first correlation value distribution operation unit and said second correlation value distribution operation unit, wherein said differential processing unit causes said correlator to take a partial charge of a differential operation of differentiating the original picture image to determine the differential image.

7. A moving-target tracking apparatus according to claim 1, wherein said motion prediction value distribution operational unit determines a prediction motion vector predicting a motion of the moving-target from a present instant to a next instant, and provides such a processing that a prediction value, which indicates a maximum probability at an existence prediction position of the moving-target at the next position represented by the prediction motion vector, and a probability which is lowered with further distances from the existence prediction position, is associated with each of pixels on a search area.

8. A moving-target tracking apparatus according to claim 7, wherein said motion prediction value distribution operational unit determines a prediction motion vector predicting a motion of the moving-target from a present instant to a next instant in accordance with the prediction motion vector determined at a past instant, which is representative of the existing prediction position of the moving-target at the present instance, and a motion vector representative of an actual motion of the moving-target, which is determined based on a difference between existence positions of the moving-target detected by said position detecting unit at both the past instant and the present instant.

9. A moving-target tracking apparatus according to claim 7, wherein said motion prediction value distribution operational unit provides such a processing that a motion prediction value, which is given as a function of a distance on the existence prediction position of the moving-target represented by said prediction motion vector, is associated with each of pixels on the search area.

10. A moving-target tracking apparatus according to claim 7, wherein said motion prediction value distribution operational unit provides such a processing that a motion prediction value, having two types of weight in which weight for a distance in a direction of the prediction motion vector is different from weight for a distance in a direction intersecting the direction of the prediction motion vector, said motion prediction value being given in form of a function of said two distances, is associated with each of pixels on the search area.

11. A moving-target tracking apparatus according to claim 7, wherein said motion prediction value distribution operational unit provides such a processing that a motion prediction value, given in form of a function in which a magnitude of the prediction motion vector is a variable, is associated with each of pixels on the search area.

12. A moving-target tracking apparatus according to claim 1, wherein said second correlation value distribution operational unit sets up as the differential template a predetermined image area on a differential image, including a predetermined position on the differential image, which is identical with a predetermined position on the original picture image designated prior to tracking the moving-target.

13. A moving-target tracking apparatus according to claim 12, wherein said color template includes a fixed template, and said first correlation value distribution operational unit sets up as the fixed template an image area on the color separation image, which is detected by said position detecting unit at an instant when the differential template is set up or finally renewed, the image area including an existence position of the moving-target.

14. A moving-target tracking apparatus according to claim 1, wherein said second correlation value distribution operational unit detects a segment area on an image area having a size larger than a size of a differential template, on a differential image, said image area including a predetermined position on the differential image, which is identical with a predetermined position on the original picture image designated prior to tracking the moving-target, said segment area being high in a degree of approximation to a common template set up on a common basis to moving objects capable of being designated as the moving-target, and having a same size as the differential template, and sets up said segment area as the differential template.

15. A moving-target tracking apparatus according to claim 14, wherein said second correlation value distribution operational unit comprises a differential template renewal unit for merging with the differential template image areas on the differential image, which are detected by said position detecting unit at one or more instants after the differential template is set up first, each of the image areas including an existence position of the moving-target, to renew the differential template, said differential template renewal unit being operative at a predetermined initial stage after an initiation of tracking of the moving-target.

16. A moving-target tracking apparatus according to claim 15, wherein said color template includes a fixed template, and said first correlation value distribution operational unit sets up as the fixed template an image area on the color separation image, which is detected by said position detecting unit at an instant when the differential template is set up or finally renewed, the image area including an existence position of the moving-target.

17. A moving-target tracking apparatus according to claim 14, wherein said color template includes a fixed template, and said first correlation value distribution operational unit sets up as the fixed template an image area on the color separation image, which is detected by said position detecting unit at an instant when the differential template is set up or finally renewed, the image area including an existence position of the moving-target.

* * * * *